US008601590B2

(12) United States Patent
Nakano et al.

(10) Patent No.: US 8,601,590 B2
(45) Date of Patent: Dec. 3, 2013

(54) CONTENT DISTRIBUTION SYSTEM

(75) Inventors: Toshihisa Nakano, Osaka (JP); Masao Nonaka, Osaka (JP); Yuichi Futa, Osaka (JP); Motoji Ohmori, Osaka (JP); Ryo Nojima, Tokyo (JP); Kazukuni Kobara, Chiba (JP); Hideki Imai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1334 days.

(21) Appl. No.: 11/790,609

(22) Filed: Apr. 26, 2007

(65) Prior Publication Data
US 2007/0256141 A1 Nov. 1, 2007

(30) Foreign Application Priority Data

Apr. 27, 2006 (JP) ................................ 2006-123618

(51) Int. Cl.
G06F 21/00 (2013.01)
G06F 21/16 (2013.01)
G06F 21/10 (2013.01)
(52) U.S. Cl.
CPC .............. G06F 21/16 (2013.01); *G06F 21/10* (2013.01)
USPC .................. 726/26; 726/32; 713/176; 705/57
(58) Field of Classification Search
USPC ...................................................... 726/26, 27
See application file for complete search history.

(56) References Cited

U.S. PATENT DOCUMENTS

| 5,530,751 | A | * | 6/1996 | Morris | 380/202 |
| 5,574,787 | A | * | 11/1996 | Ryan | 380/201 |
| 5,579,390 | A | * | 11/1996 | Ryan et al. | 380/218 |
| 5,651,065 | A | * | 7/1997 | Stufflet et al. | 380/213 |
| 5,809,139 | A | * | 9/1998 | Girod et al. | 380/202 |
| 6,285,774 | B1 | | 9/2001 | Schumann et al. | |
| 6,519,700 | B1 | * | 2/2003 | Ta et al. | 713/193 |
| 6,763,464 | B2 | * | 7/2004 | Wang et al. | 713/193 |
| 6,885,748 | B1 | * | 4/2005 | Wang | 380/201 |
| 6,954,738 | B2 | * | 10/2005 | Wang et al. | 705/59 |
| 6,954,854 | B1 | * | 10/2005 | Miura et al. | 713/168 |
| 7,516,491 | B1 | * | 4/2009 | Schlafly | 726/26 |
| 2002/0120574 | A1 | * | 8/2002 | Ezaki | 705/51 |
| 2002/0184515 | A1 | * | 12/2002 | Oho et al. | 713/193 |
| 2003/0074553 | A1 | * | 4/2003 | Arkko et al. | 713/151 |
| 2003/0161473 | A1 | * | 8/2003 | Fransdonk | 380/277 |
| 2003/0167392 | A1 | * | 9/2003 | Fransdonk | 713/156 |

(Continued)

FOREIGN PATENT DOCUMENTS

WO WO2005059727 A1 * 6/2005 ............... G06F 1/00

*Primary Examiner* — Ashok Patel
*Assistant Examiner* — Alexander Lagor
(74) *Attorney, Agent, or Firm* — Wenderoth, Lind & Ponack, L.L.P.

(57) ABSTRACT

A content distribution system for transferring contents between transmission device and reception device. The transmission device includes: key obtaining unit that obtains, from reception device, public keys and public key identifiers; watermark embedding unit that embeds a different public key identifier, as electronic watermark, into each of contents that are identical in substance; an encryption unit that encrypts contents using public keys to generate encrypted contents; and transmission unit that transmits encrypted contents to reception device. The reception device includes: key storage unit storing public keys, public key identifiers, and a private key that makes a pair with one of the public keys; key transmission unit that transmits public keys and public key identifiers to the transmission device; content receiving unit that receives encrypted contents from transmission device; and decryption unit that obtains a content from the received encrypted contents, using the private key.

11 Claims, 18 Drawing Sheets

(56) References Cited

U.S. PATENT DOCUMENTS

| | | | |
|---|---|---|---|
| 2004/0109569 A1* | 6/2004 | Ellison et al. | 380/277 |
| 2005/0091524 A1* | 4/2005 | Abe et al. | 713/200 |
| 2005/0096753 A1* | 5/2005 | Arling et al. | 700/11 |
| 2005/0169498 A1* | 8/2005 | Choi et al. | 382/100 |
| 2005/0273862 A1* | 12/2005 | Benaloh et al. | 726/26 |
| 2007/0192610 A1* | 8/2007 | Chun et al. | 713/176 |

* cited by examiner

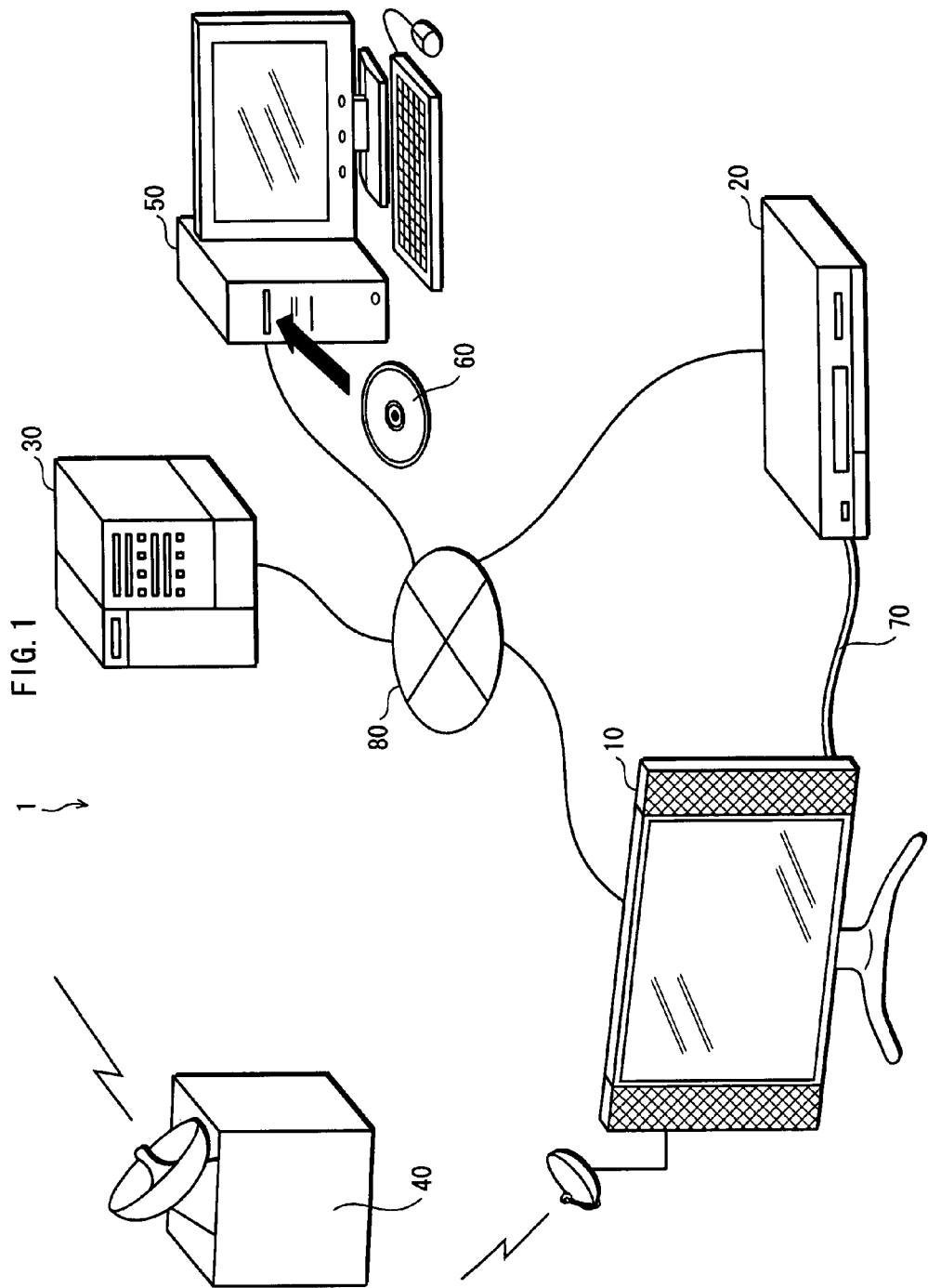

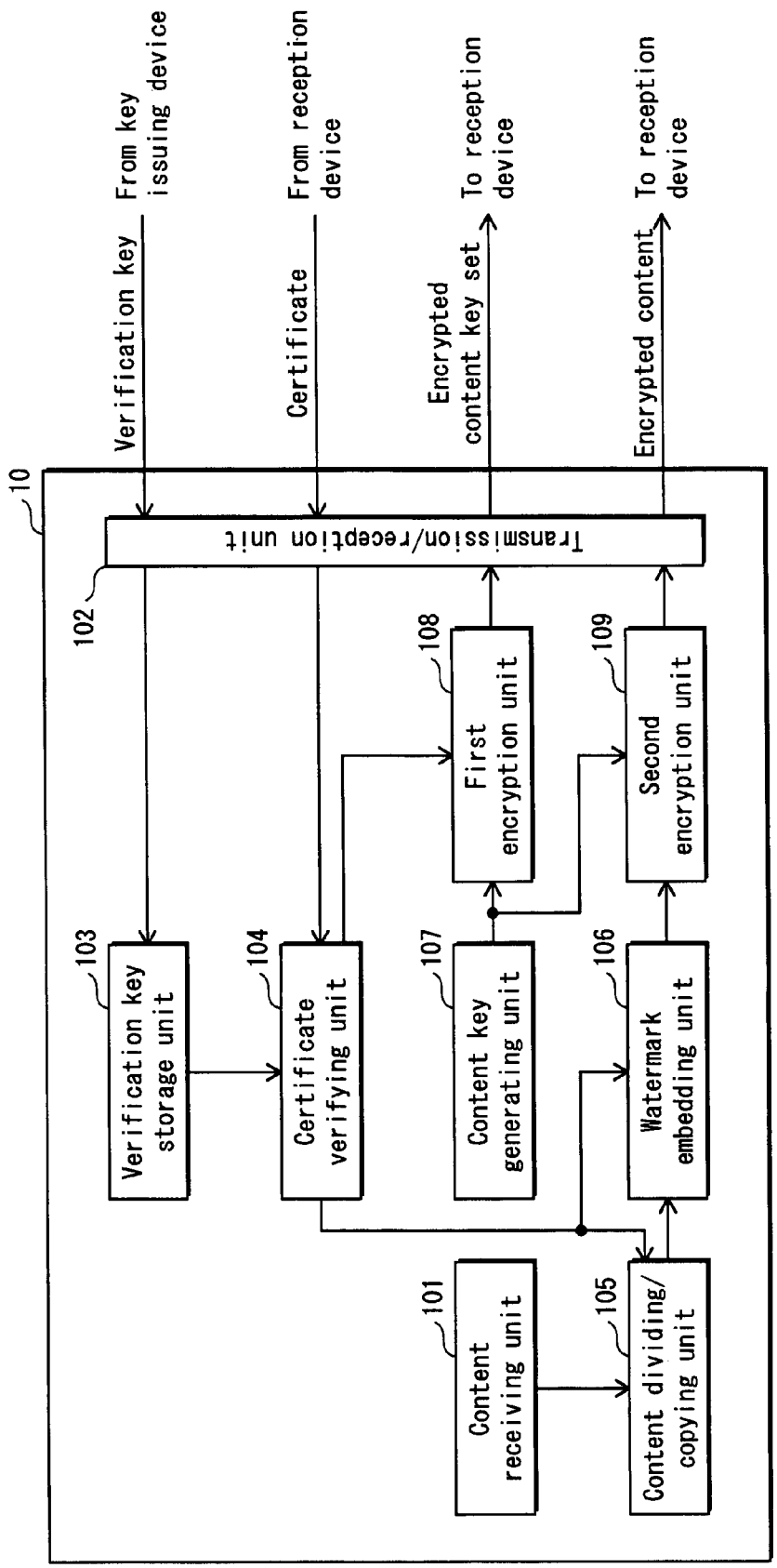

FIG. 3A

Certificate 1                                110

| Public key ID    | ID1  |
| Public key       | PK1  |
| Digital signature| SIG1 |

FIG. 3B

Certificate 2                                120

| Public key ID    | ID2  |
| Public key       | PK2  |
| Digital signature| SIG2 |

FIG. 3C

Certificate 3                                130

| Public key ID    | ID3  |
| Public key       | PK3  |
| Digital signature| SIG3 |

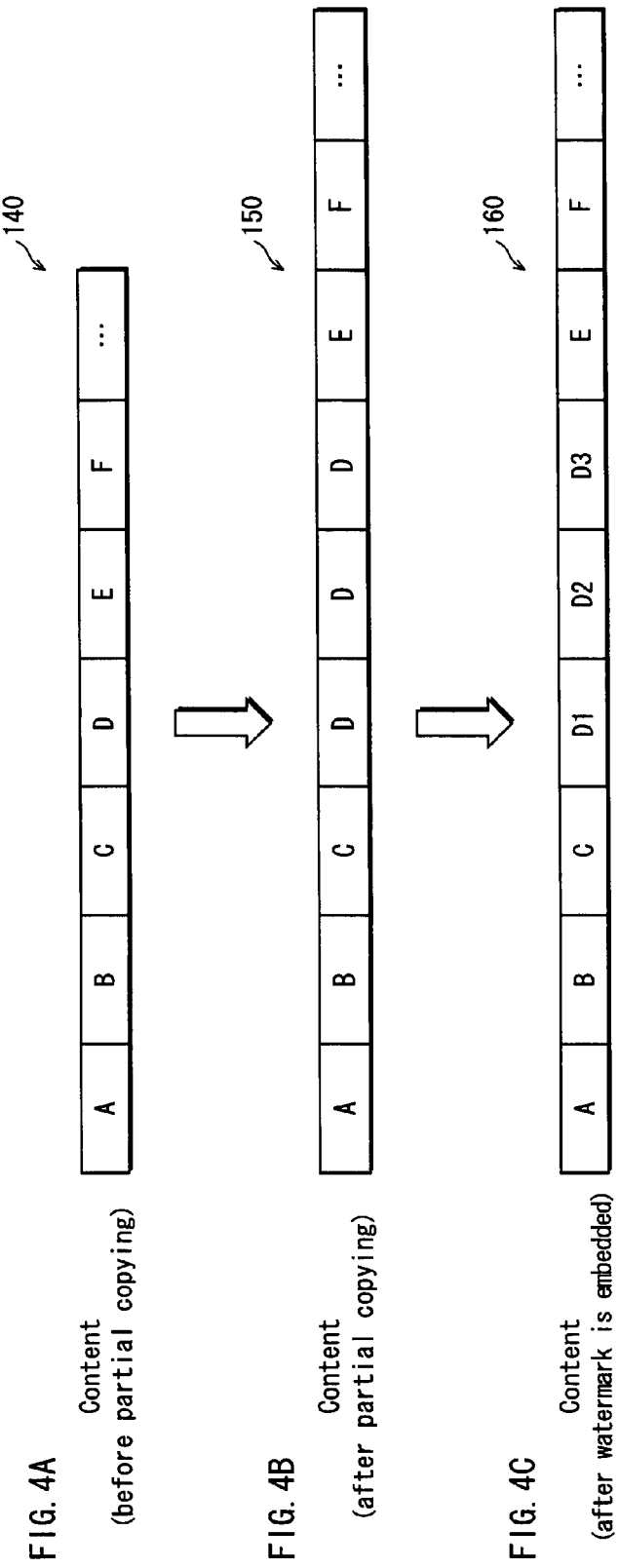

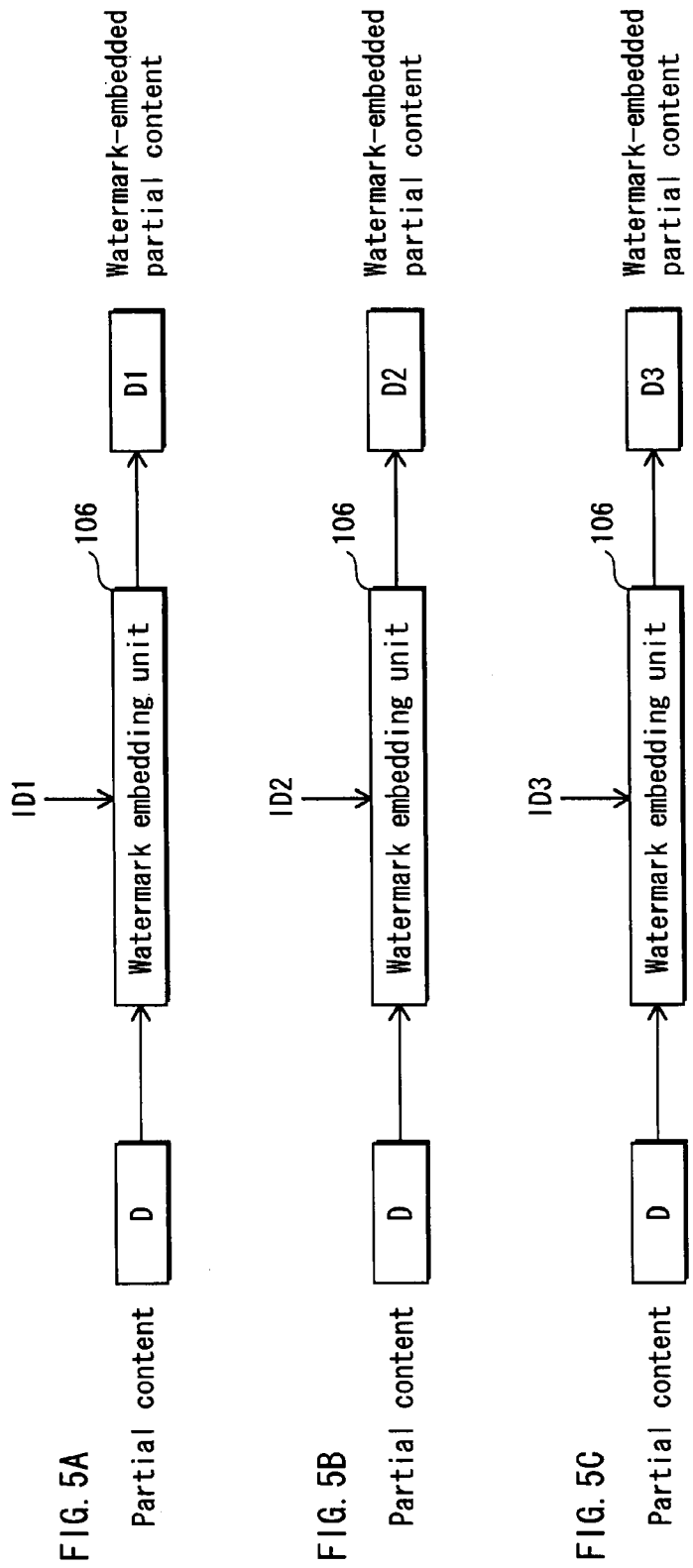

| ID1 | E1 (PK1, Kt) |
|-----|--------------|
| ID2 | E1 (PK2, Kt) |
| ID3 | E1 (PK3, Kt) |
| ID1 | E1 (PK1, K1) |
| ID2 | E1 (PK2, K2) |
| ID3 | E1 (PK3, K3) |

FIG. 9

| | | Certificate 1 | ... |
|---|---|---|---|
| 211 | 1 | Certificate 2 | Private key 2 (SK2) |
| | | Certificate 3 | ... |

| | | Certificate 1 | Dummy private key 1 (DummySK1) |
|---|---|---|---|
| 221 | 1 | Certificate 2 | Private key 2 (SK2) |
| | | Certificate 3 | Dummy private key 3 (DummySK3) |

| | Certificate 1 | Private key 1 (SK1) |
| --- | --- | --- |
| 1 | Certificate 2 | Private key 2 (SK2) |
| | Certificate 3 | Private key 3 (SK3) |

| Watermark (public key ID) | Source device |
| --- | --- |
| ID1, ID3 | Transmission device |
| ID2 | Reception device |

CONTENT DISTRIBUTION SYSTEM

This application is based on an application No. 2006-123618 filed in Japan, the content of which is hereby incorporated by reference.

BACKGROUND OF THE INVENTION

(1) Field of the Invention

The present invention relates to a technology for transmitting/receiving a piece of digital data such as a movie or music (hereinafter, such a digital data piece is referred to as "content"), and specifically relates to a technology for preventing copyright infringement such as copying a content in an unauthorized manner, and, if an unauthorized copy of a content is found to be distributed, identifying a device that generated the unauthorized copy.

(2) Description of the Related Art

In recent years, as the personal use of contents has become prevalent, what are called "pirated contents", which are generated by copying contents in an unauthorized manner, have begun to circulate.

Document 1 discloses a technology for identifying, from an unauthorized copy, a client that has made the unauthorized copy, within a model where a server distributes contents to clients.

More specifically, the server copies a scene within a content to generate a plurality of copies of the scene, and embeds different electronic watermarks respectively into the copies of the scene. The server then encrypts each of the plurality of copies using a different encryption key, and distributes the content to the clients. Each client holds one of a plurality of different keys, and plays back the content by decrypting a specified portion of the content using the key.

Subsequently, if a pirated content of the content is found to be distributed, it is possible to identify the client that made the unauthorized copy by checking the electronic watermark that is embedded in the pirated content.

However, there is a possibility that, although it should not happen, the server performs unauthorized copying, and there is a demand from content holders to prevent the server from performing the unauthorized copying.

Also, recently, in some homes, a plurality of terminal devices held by users are connected to each other via a network, and contents are transferred between the terminal devices. In such a case, each terminal device can be either a server (transmission side) or a client (reception side). This requires a mechanism for preventing the transmission side, as well as the reception side, from performing an unauthorized act.

Here, a problem of the technology recited in Document 1 is that it cannot prevent the transmission side from performing an unauthorized act, although it does the reception side.

Document: U.S. Pat. No. 6,285,774

SUMMARY OF THE INVENTION

The object of the present invention is therefore to provide a content distribution system for preventing a transmission device, which transmits a content, from performing an unauthorized act by disguising a reception device which receives a content.

Here, an explanation will be given with respect to the recitation that "a transmission device performs an unauthorized act by disguising a reception device".

A transmission device, which obtains a content from a content holder, is expected to distribute the content via authorized distribution routes. If the transmission device generates a pirated content by copying the content in an unauthorized manner and distributes the pirated content, the unauthorized act is easily detected by the content holder. For this reason, it is generally inconceivable that the transmission device performs such an unauthorized act. However, it is possible for the transmission device to generate a pirated content by embedding thereinto information indicating that a reception device made the unauthorized copy, as will be discussed later.

Further, in a situation where contents are transferred between terminal devices held by users, a terminal device on the transmission side can generate a pirated content by embedding thereinto information indicating that a terminal device on the reception side made the unauthorized copy, as will be discussed later. Especially in this case, there is a high possibility that an unauthorized act is performed because contents are transferred between terminal devices held by end users.

Any of the above-described cases is referred to as "a transmission device performs an unauthorized act by disguising a reception device".

The above object is fulfilled by a content distribution system for transferring contents between a transmission device and a reception device, the transmission device comprising: a key obtaining unit operable to obtain, from the reception device, a plurality of public keys and a plurality of public key identifiers for identifying the public keys respectively; a watermark embedding unit operable to embed a different public key identifier, as an electronic watermark, into each of a plurality of contents that are identical with each other in substance; an encryption unit operable to encrypt the plurality of contents using public keys identified by public key identifiers embedded in the contents respectively and thereby generate a plurality of encrypted contents; and a transmission unit operable to transmit the plurality of encrypted contents to the reception device, and the reception device comprising: a key storage unit storing therein a plurality of public keys, a plurality of public key identifiers for identifying the public keys respectively, and a private key that makes a pair with one of the plurality of public keys; a key transmission unit operable to transmit the plurality of public keys and the plurality of public key identifiers to the transmission device; a content receiving unit operable to receive the plurality of encrypted contents from the transmission device; and a decryption unit operable to obtain a content from the received encrypted contents, using the private key.

With the above-described structure, the transmission device transmits a plurality of encrypted contents, in which respectively different electronic watermarks have been embedded, to the reception device. The reception device can decrypt only one of the plurality of encrypted contents received from the transmission device. And the transmission device cannot recognize which public key corresponds to the private key held by the reception device, and is thus unable to identify the content obtained by the reception device.

For the above-stated reason, it is extremely difficult for the transmission device to identify the content obtained by the reception device, make copies of a content in which the same electronic watermark as that embedded in the content obtained by the reception device is embedded, distributes only the copies, and not to distribute any contents in which other electronic watermarks are embedded. Accordingly, it is realistically impossible for the transmission device to distribute pirated contents by disguising the reception device.

The above object is also fulfilled by a reception device for obtaining contents from a transmission device, comprising: a key storage unit storing therein a plurality of public keys, a plurality of public key identifiers for identifying the public keys respectively, and a private key that makes a pair with one of the plurality of public keys; a key transmission unit operable to transmit the plurality of public keys and the plurality of public key identifiers to the transmission device; a content receiving unit operable to receive, from the transmission device, a plurality of encrypted contents that were generated by the transmission device by encrypting a plurality of contents, which were identical with each other in substance, respectively using public keys identified by public key identifiers that had been embedded, as an electronic watermark, in the contents; and a decryption unit operable to obtain a content from the received encrypted contents, using the private key.

With the above-described structure, the reception device can transmit, to the transmission device being the transmission source of the content, a plurality of public keys without notifying thereto one of the public keys that makes a pair with the private key held by the reception device. This structure is based on a characteristic of the public key encryption method that a private key corresponding to a public key cannot be generated from the public key itself. With such a structure, the reception device can prevent the transmission device from performing an unauthorized act by disguising the reception device.

In the above-stated reception device, the key storage unit may store a plurality of certificates each of which includes a public key being a different one of the plurality of public keys, a public key identifier being a different one of the plurality of public key identifiers, and a digital signature for the public key and the public key identifier in a same certificate, and the key transmission unit transmits the plurality of certificates to the transmission device.

With the above-described structure, the reception device transmits public key certificates to the transmission device. This enables the reception device to transmit/receive a content to/from the transmission device using a public key and a private key that have been obtained in an authorized manner.

In the above-stated reception device, the plurality of encrypted contents may have been generated by encrypting the plurality of contents, which were identical with each other in substance, respectively using a plurality of different content keys as encryption keys, the content receiving unit receives the plurality of encrypted contents and a plurality of encrypted content keys that were generated by encrypting the plurality of content keys respectively using the plurality of public keys as encryption keys, and the decryption unit identifies an encrypted content key in accordance with the public key identifiers, generates a content key by decrypting the identified encrypted content key using the private key, and obtains a content using the generated content key.

With the above-described structure, the reception device can reduce the processing load by encrypting a content having a large data size by the common key encryption method, using a content key as the encryption key, and encrypting a content having a small data size by the public key encryption method, using a public key as the encryption key.

In the above-stated reception device, the key storage unit may store a plurality of dummy private keys each of which corresponds to a different one of the plurality of public keys except for a public key that makes a pair with the private key, wherein each dummy private key prevents an encrypted text, which was generated by encrypting a plain text using, as an encryption key, a public key that corresponds to said each dummy private key, from being decrypted into a proper plain text.

With the above-described structure, even if the information stored in the key storage unit of the reception device is exposed to outside of the system by an unauthorized user, it is impossible for an outsider to immediately recognize which pairs, among the plurality of pairs of private key and public key stored in the key storage unit, are dummy pairs. Accordingly, compared with a structure where only one private key is stored in the key storage unit, the above-described structure has been improved in safety.

The above object is further fulfilled by a transmission device for transmitting contents to a reception device, comprising: a key obtaining unit operable to obtain, from the reception device, a plurality of public keys and a plurality of public key identifiers for identifying the public keys respectively; a watermark embedding unit operable to embed a different public key identifier, as an electronic watermark, into each of a plurality of contents that are identical with each other in substance; an encryption unit operable to encrypt the plurality of contents using public keys identified by public key identifiers embedded in the contents respectively and thereby generate a plurality of encrypted contents; and a transmission unit operable to transmit the plurality of encrypted contents to the reception device.

The above-stated transmission device may further comprise: a storage unit storing a content; and a copy unit operable to copy the content stored in the storage unit and thereby generate a same number of contents as the plurality of public keys obtained by the key obtaining unit.

With the above-described structure, the transmission device, transmits a plurality of encrypted contents to the reception device, cannot recognize which electronic watermark has been embedded in the content obtained by the reception device, and is thus unable to perform an unauthorized act by disguising the reception device. Accordingly, the transmission device can claim the authenticity of the transmission device if the reception device performs an unauthorized act.

In the above-stated transmission device, the encryption unit may include: a content key generating subunit operable to generate a plurality of different content keys; a key encryption subunit operable to generate a plurality of encrypted content keys by encrypting the generated plurality of content keys using the plurality of public keys, respectively; and a content encryption subunit operable to generate a plurality of encrypted contents by encrypting the plurality of contents using the plurality of encrypted content keys, respectively.

With the above-described structure, the transmission device can reduce the processing load by decrypting a content having a large data size by the common key encryption method, using a content key as the decryption key, and decrypting a content having a small data size by the public key encryption method, using a private key as the decryption key.

The above object is further fulfilled by a key issuing device for issuing a key to a reception device which receives contents from a transmission device, the key issuing device comprising: a key generating unit operable to generate a plurality of key pairs each of which includes a private key and a public key; a key storage unit operable to store the generated plurality of key pairs; a key transmission unit operable to transmit one of the plurality of key pairs and a plurality of public keys to the reception device; and a key identifying unit operable to write, into the key storage unit, identification information for identifying the key pair transmitted by the key transmission unit.

The above-described key issuing device may further comprise a dummy private key generating unit operable to generate dummy private keys respectively to replace private keys included in the plurality of key pairs except for a private key included in the key pair transmitted by the key transmission unit, wherein the key transmission unit transmits, to the reception device, the key pair and a plurality of dummy key pairs each of which includes a dummy private key and a public key.

With the above-described structure, the key issuing device sends, to the reception device being the transmission destination of the content, an authorized key pair and a plurality of public keys, or an authorized key pair and a plurality of dummy key pairs.

The key issuing device with such a structure provides the following mechanism. That is to say, in a content distribution system which is composed of a transmission device and a reception device, and in which contents are transferred between the transmission device and the reception device using public keys and private keys, the transmission device transmits a plurality of encrypted contents, which were generated using a plurality of public keys, to the reception device, and the reception device decrypts one of the received plurality of encrypted contents and thus obtains a content, while the transmission device cannot recognize which one among the plurality of encrypted contents, the reception device obtains the content from.

Further, the key issuing device can identify the authorized key pair that was sent to the reception device. Accordingly, if a pirated content is found to be distributed in the above-described content distribution system, the system manager obtains, from the key issuing device, information indicating the authorized key pair that was sent to the reception device, identifies the content obtained by the reception device, and judges whether the pirated content was distributed by the reception device or the transmission device.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 1 is a system structure diagram showing the structure of the content distribution system 1;

FIG. 2 is a functional block diagram showing the structure of the transmission device 10 in terms of the functions;

FIG. 3A shows the data structure of the certificate 1;

FIG. 3B shows the data structure of the certificate 2;

FIG. 3C shows the data structure of the certificate 3;

FIG. 4A shows content 140 (before copying) having been divided into a plurality of partial contents of a certain length;

FIG. 4B shows content 150 after copying the partial content D;

FIG. 4C shows content 160 after embedding electronic watermarks into partial contents D;

FIGS. 5A through 5C schematically show the process in which the watermark embedding unit 106 generates partial contents D1, D2, and D3 by embedding public key IDs "ID1", "ID2", and "ID3", as electronic watermarks, into partial contents D;

FIG. 6 shows the data structure of the encrypted content key set 170 transmitted from the transmission device 10 to the reception device 20;

FIG. 9 shows the data structure of the key set 210 that is obtained by the reception device 20 from the key issuing device 30;

FIG. 10 shows the data structure of the key set 220 that is obtained by the reception device 20 from the key issuing device 30;

FIG. 12 shows the data structure of the key set 310;

FIG. 13 shows the data structure of the source identification information 320;

DETAILED DESCRIPTION OF THE INVENTION

Figure 7:
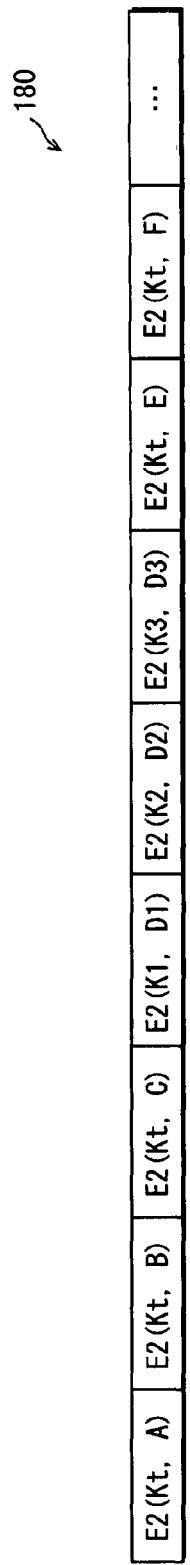
FIG. 7 shows the encrypted content 180 transmitted from the transmission device 10 to the reception device 20.

A content distribution system 1 of the present invention will be described with reference to the attached drawings.

<Overview>

The following is an overview of the content distribution system 1.

FIG. 1 is a system structure diagram showing the structure of the content distribution system 1.

As shown in FIG. 1, the content distribution system 1 includes a transmission device 10, a reception device 20, a key issuing device 30, a broadcast station device 40, an unauthentic content source identifying device 50, and a recording medium 60. Here, the transmission device 10 and the reception device 20 are connected to each other via a cable 70. Also, the transmission device 10, the reception device 20, the key issuing device 30, and the unauthentic content source identifying device 50 are connected to each other via a network 80.

The broadcast station device 40 is more specifically a device installed in a broadcast station that broadcasts via terrestrial digital broadcasting, and broadcasts a content over a digital broadcast wave.

Here, the terrestrial digital broadcasting contents broadcast by the broadcast station device 40 is protected by the B-CAS (BS-Conditional Access System), which is a copyright protection standard for broadcasting.

The transmission device 10 is more specifically a digital TV receiver that receives the terrestrial digital broadcasting, and receives the content broadcast from the broadcast station device 40. The transmission device 10 removes the protection by the B-CAS from the content, and displays the content on the display. The transmission device 10 receives a verification key for verifying the authenticity of certificates from the key issuing device 30. The transmission device 10 receives the certificates from the reception device 20, and generates an encrypted content by encrypting a contents based on the received certificates. The transmission device 10 transmits the generated encrypted content to the reception device 20 via the cable 70. Here, more specifically, the cable 70 is an IEEE1394 cable, and the transmission device 10 and the reception device 20 transmit/receive encrypted contents protected by the DTCP (Digital Transmission Content Protection), which is a copyright protection standard of IEEE1394.

The reception device 20 is more specifically a DVD recorder. First, the reception device 20 receives a public key certificate and a private key from the key issuing device 30. Then, the reception device 20 transmits the public key certificate to the transmission device 10, and receives an encrypted content, which is encrypted based on the public key certificate, from the transmission device 10. The reception device 20 decrypts the received encrypted content, and uses the content obtained by the decryption.

The recording medium 60 is more specifically a DVD-RAM, and stores therein what is called a pirated content that was generated by unauthorized copying.

<Structure>

1. Transmission Device 10

FIG. 2 is a functional block diagram showing the structure of the transmission device 10. As shown in FIG. 2, the transmission device 10 includes a content receiving unit 101, a transmission/reception unit 102, a verification key storage unit 103, a certificate verifying unit 104, a content dividing/copying unit 105, a watermark embedding unit 106, a content key generating unit 107, a first encryption unit 108, and a second encryption unit 109.

The transmission device 10 is more specifically a computer system including a microprocessor, a ROM, a RAM, a hard disk unit and the like. A computer program is recorded in the ROM, the RAM or the hard disk unit. The transmission device 10 achieves its functions as the microprocessor operates in accordance with the computer program. Furthermore, as described earlier, the transmission device 10 is a digital TV receiver that receives the terrestrial digital broadcasting.

Now, each block constituting the transmission device 10 will be described.

(1) Content Receiving Unit 101,

The content key receiving unit 101 receives a content distributed from the broadcast station device 40, and outputs the received content to the content dividing/copying unit 105.

(2) Transmission/Reception Unit 102

The transmission/reception unit 102 is provided with a network connection unit and an IEEE1394 connection unit. The transmission/reception unit 102 transmits/receives information to/from the key issuing device 30 via the network 80, and transmits/receives information to/from the reception device 20 via the cable 70.

More specifically, the transmission/reception unit 102 receives the verification key from the key issuing device 30. Further, the transmission/reception unit 102 receives a plurality of certificates from the reception device 20, and transmits an encrypted content key set and an encrypted content to the reception device 20.

(3) Verification Key Storage Unit 103

The verification key storage unit 103 receives the verification key from the transmission/reception unit 102, and stores therein the received verification key. The verification key is a key used to verify the authenticity of the certificates received from the reception device 20.

(4) Certificate Verifying Unit 104

The certificate verifying unit 104 receives the certificates from the content key receiving unit 101, and verifies the received certificates using the verification key stored in the verification key storage unit 103.

More specifically, the certificate verifying unit 104 receives, from the reception device 20 via the transmission/reception unit 102 and the network 80, a certificate 1 (110) shown in FIG. 3A, a certificate 2 (120) shown in FIG. 3B, and a certificate 3 (130) shown in FIG. 3C.

As shown in FIGS. 3A to 3C, each certificate is composed of a public key ID, a public key, and a digital signature. Here, digital signature "SIG1" contained in the certificate 1 (110) is a digital signature generated by the key issuing device 30, for public key ID "ID1" and public key "PK1", using a signature generation key based on a predetermined signature generation algorithm. Similarly, digital signature "SIG2" contained in the certificate 2 (120) is a digital signature generated for public key ID "ID2" and public key "PK2", and digital signature "SIG3" contained in the certificate 3 (130) is a digital signature generated for public key ID "ID3" and public key "PK3".

Each verification key corresponds to a signature generation key that was used for generating each digital signature. The certificate verifying unit 104 verifies the authenticity of each certificate by applying a signature verification algorithm to each digital signature using a verification key, where the signature verification algorithm corresponds to the signature generation algorithm. It should be noted here that the generation and verification of the digital signature can be realized by a known technology, and description thereof is omitted here.

When it succeeds in verifying all certificates, the certificate verifying unit 104 outputs the public key IDs contained in each certificate to the content dividing/copying unit 105 and the watermark embedding unit 106, and outputs the public key IDs and public keys contained in each certificate to the first encryption unit 108.

The certificate verifying unit 104 ends the process when it fails to verify one or more certificates.

(5) Content Dividing/Copying Unit 105

The content dividing/copying unit 105 receives the content from the content key receiving unit 101.

The content dividing/copying unit 105 divides the received content into a plurality of partial contents in a predetermined unit (for example, in a unit of picture). FIG. 4A shows a content 140 having been divided into a plurality of partial contents by the content dividing/copying unit 105. The content 140 shown in FIG. 4A is composed of a plurality of partial contents (partial content A, partial content B, partial content C, partial content D, partial content E, partial content F, . . . ).

The content dividing/copying unit 105, upon receiving the public key IDs from the certificate verifying unit 104, selects an arbitrary one of the plurality of partial contents, and copies the selected partial content such that the content contains as many partial contents as the number of received public key IDs. FIG. 4B shows a content 150 after the content dividing/copying unit 105 selects partial content D as the arbitrary partial content, and the partial content D is copied. In this example, the content dividing/copying unit 105 receives three public key IDs "ID1", "ID2", and "ID3" from the certificate verifying unit 104, so the content dividing/copying unit 105 copies the partial content D and generates the content 150 containing three partial contents D.

The content dividing/copying unit 105 outputs the content 150 after the copying to the watermark embedding unit 106.

(6) Watermark Embedding Unit 106

The watermark embedding unit 106 receives the three public key IDs "ID1", "ID2", and "ID3" from the certificate verifying unit 104. The watermark embedding unit 106 also receives the content 150 after the copying of the partial content D, from the content dividing/copying unit 105. The watermark embedding unit 106 embeds the public key IDs "ID1", "ID2", and "ID3", as electronic watermarks, into the three partial contents D, respectively.

FIG. 5A schematically shows the process in which the watermark embedding unit 106 generates a partial content D1 by embedding the public key ID "ID1", as an electronic watermark, into a partial content D.

FIG. 5B schematically shows the process in which the watermark embedding unit 106 generates a partial content D2 by embedding the public key ID "ID2", as an electronic watermark, into a partial content D.

FIG. 5C schematically shows the process in which the watermark embedding unit 106 generates a partial content D3 by embedding the public key ID "ID3", as an electronic watermark, into a partial content D.

FIG. 4C shows a content 160 after the electronic watermarks are embedded into each partial content D. The watermark embedding unit 106 outputs the content 160 to the second encryption unit 109.

Here, the electronic watermark is a technology for embedding watermark information, which is of a level that cannot be perceived by the human being, into still pictures, moving pictures, audio data or the like, and is characterized in that the embedded watermark is not eliminated even if the data containing thereof is processed or modified. The technology for embedding the electronic watermark is known, and description thereof is omitted.

(7) Content Key Generating Unit 107

The content key generating unit 107 generates content keys used for encrypting a content.

More specifically, the content key generating unit 107 generates: a content key Kt used for encrypting partial contents in which no electronic watermark has been embedded; a content key K1 used for encrypting the partial content D1 in which an electronic watermark has been embedded; a content key K2 used for encrypting the partial content D2 in which an electronic watermark has been embedded; and a content key K3 used for encrypting the partial content D3 in which an electronic watermark has been embedded.

The content key generating unit 107 outputs the generated content key Kt, content key K1, content key K2, and content key K3 to the first encryption unit 108 and the second encryption unit 109.

(8) First Encryption Unit 108

The first encryption unit 108 generates encrypted content keys by encrypting the content keys generated by the content key generating unit 107 using public keys contained in the certificates.

More specifically, the first encryption unit 108 receives the public key IDs and public keys PK1, PK2, and PK3. The first encryption unit 108 also receives the content keys Kt, K1, K2, and K3 from the content key generating unit 107.

The first encryption unit 108 generates three encrypted content keys E1 (PK1, Kt), E1 (PK2, Kt), and E1 (PK3, Kt) by applying an encryption algorithm E1 to the content key Kt, which is used for encrypting the partial contents in which no electronic watermark is embedded, using the public keys PK1, PK2, and PK3 as the encryption keys. Here, E1 (A,B) denotes encrypted data obtained by encrypting data B by applying the encryption algorithm E1 to the data B using a key A. Here, one example of the encryption algorithm E1 is the RSA encryption.

The first encryption unit 108 also generates an encrypted content key E1 (PK1, K1) by applying the encryption algorithm E1 to the content key K1, which is used for encrypting the partial content D1, using the public key PK1 as the encryption key. Here, the partial content D1 is a partial content in which the public key ID "ID1" is embedded as an electronic watermark. The public key ID "ID1" is an ID for identifying the public key PK1.

The first encryption unit 108 also generates an encrypted content key E1 (PK2, K2) by applying the encryption algorithm E1 to the content key K2, which is used for encrypting the partial content D2, using the public key PK2 as the encryption key. Here, the partial content D2 is a partial content in which the public key ID "ID2" is embedded as an electronic watermark. The public key ID "ID2" is an ID for identifying the public key PK2.

The first encryption unit 108 also generates an encrypted content key E1 (PK3, K3) by applying the encryption algorithm E1 to the content key K3, which is used for encrypting the partial content D3, using the public key PK3 as the encryption key. Here, the partial content D3 is a partial content in which the public key ID "ID3" is embedded as an electronic watermark. The public key ID "ID3" is an ID for identifying the public key PK3.

The first encryption unit 108 generates an encrypted content key set 170 shown in FIG. 6, by associating the generated encrypted content keys with public key IDs of the public keys used as the encryption keys.

The first encryption unit 108 transmits the generated encrypted content key set 170 to the reception device 20 via the transmission/reception unit 102 and the cable 70.

(9) Second Encryption Unit 109

The second encryption unit 109 receives the content 160 (see FIG. 4B) from the watermark embedding unit 106. The second encryption unit 109 also receives the content keys Kt, K1, K2, and K3 from the content key generating unit 107.

The second encryption unit 109 generates encrypted partial contents E2 (Kt,A), E2 (Kt, B), E2 (Kt, C), E2 (Kt, E), E2 (Kt, F), . . . by applying an encryption algorithm E2 to, among the partial contents of the content 160, the partial contents in which no electronic watermark is embedded, using the content key Kt as the encryption key. Here, one example of the encryption algorithm E2 is the DES (Data Encryption Standard).

The second encryption unit 109 also generates an encrypted partial content E2 (K1, D1) by applying the encryption algorithm E2 to the partial contents D1 of the content 160, using the content key K1 as the encryption key.

The second encryption unit 109 also generates an encrypted partial content E2 (K2, D2) by applying the encryption algorithm E2 to the partial contents D2 of the content 160, using the content key K2 as the encryption key.

The second encryption unit 109 also generates an encrypted partial content E2 (K3, D3) by applying the encryption algorithm E2 to the partial contents D3 of the content 160, using the content key K3 as the encryption key.

FIG. 7 shows an encrypted content 180 composed of the encrypted partial contents that have been encrypted as described above by the second encryption unit 109.

The second encryption unit 109 transmits the generated encrypted content 180 to the reception device 20 via the transmission/reception unit 102 and the cable 70.

2. Reception Device 20

Figure 8:
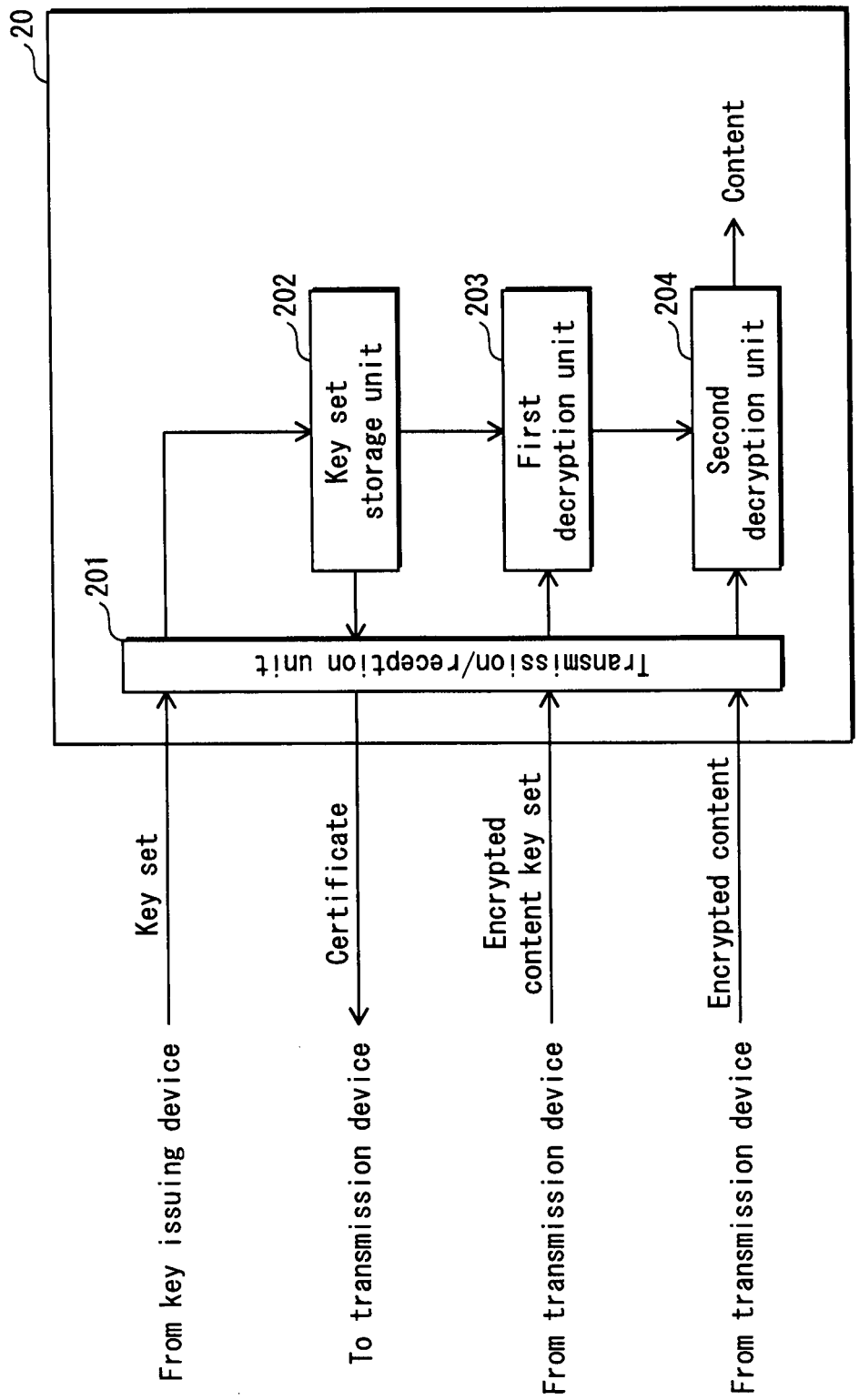
FIG. 8 is a functional block diagram showing the structure of the reception device 20 in terms of the functions.

FIG. 8 is a functional block diagram showing the structure of the reception device 20.

As shown in FIG. 8, the reception device 20 includes a transmission/reception unit 201, a key set storage unit 202, a first decryption unit 203, and a second decryption unit 204.

The reception device 20 is more specifically a computer system including a microprocessor, a ROM, a RAM, a hard disk unit and the like. A computer program is recorded in the ROM, the RAM or the hard disk unit. The reception device 20 achieves its functions as the microprocessor operates in accordance with the computer program. Furthermore, as described earlier, the reception device 20 is a DVD recorder.

Now, each block constituting the reception device 20 will be described.

(1) Transmission/Reception Unit 201

The transmission/reception unit 201 is provided with a network connection unit and an IEEE1394 connection unit. The transmission/reception unit 201 transmits/receives information to/from the key issuing device 30 via the network 80, and transmits/receives information to/from the transmission device 10 via the cable 70.

More specifically, the transmission/reception unit 201 receives a key set from the key issuing device 30. The transmission/reception unit 201 transmits the certificates to the transmission device 10, and receives the encrypted content key set and the encrypted content from the transmission device 10.

(2) Key Set Storage Unit 202

The key set storage unit 202 receives the key set from the transmission/reception unit 201, and stores the received key set thereinto.

FIGS. 9 and 10 show specific examples of key sets that the reception device 20 receives from the key issuing device 30.

A key set 210 shown in FIG. 9 includes a certificate 1, a certificate 2, a certificate 3, and a private key 2 (SK2) that is associated with the certificate 2. And a flag 211 is set in the key set 210 to indicate that the obtained private key 2 is associated with the certificate 2.

Here, the certificate 1 includes, as shown in FIG. 3A, public key ID"ID1", public key"PK1", and digital signature "SIG1". Also, the certificate 2 includes, as shown in FIG. 3B, public key ID"ID2", public key"PK2", and digital signature "SIG2". Also, the certificate 3 includes, as shown in FIG. 3C, public key ID "ID3", public key "PK3", and digital signature "SIG3".

The public key PK2 and the private key SK2 make a key pair, corresponding to each other.

A key set 220 shown in FIG. 10 includes the certificate 1, the certificate 2, the certificate 3, and a dummy private key 1 (DummySK1) that is associated with the certificate 1, the private key (SK2) that is associated with the certificate 2, and a dummy private key 3 (DummySK3) that is associated with the certificate 3. The structures of the certificates 1 through 3 are shown in FIGS. 3A through 3C, respectively.

Here, although it is associated with the certificate 1, the dummy private key 1 (DummySK1) does not contain any key data that makes pair with the public key PK1, and is dummy data. Similarly, although it is associated with the certificate 3, the dummy private key 3 (DummySK3) does not contain any key data that makes a pair with the public key PK3, and is dummy data.

Among the private keys contained in the key set 220, only the private key 2 (SK2) properly makes a pair with a public key. For this reason, a flag 221 is set in the key set 220 to indicate that a private key that properly makes a pair with a public key is the private key 2.

It should be noted here that the reception device 20 performs the same process regardless of whether the reception device 20 receives the key set 210 or the key set 220 from the key issuing device 30. In the following description, it is presumed that the reception device 20 obtains the key set 210 from the key issuing device 30.

When the reception device 20 requests a content to the transmission device 10, the key set storage unit 202 transmits all certificates (certificate 1, certificate 2, and certificate 3) contained in the key set 210, to the transmission device 10 via the transmission/reception unit 201 and the cable 70.

(3) First Decryption Unit 203

The first decryption unit 203 receives the encrypted content key set 170 from the transmission device 10 via the transmission/reception unit 201 and the cable 70. The structure of the encrypted content key set 170 is shown in FIG. 6.

Upon receiving the encrypted content key set 170, the first decryption unit 203 extracts a public key ID (ID2), which is contained in a certificate to which the flag is set, from the key set 210 stored in the key set storage unit 202.

The first decryption unit 203 then extracts, from the encrypted content key set 170, the encrypted content keys E1 (PK2,Kt) and E1 (PK2,K2) that are identified by the extracted public key ID (ID2), and reads out the private key 2 (SK2) from the key set 210 stored in the key set storage unit 202.

The first decryption unit 203 obtains the content key Kt by applying a decryption algorithm. D1 to the encrypted content key E1 (PK2,Kt), using the private key 2 (SK2) as the decryption key. Similarly, the first decryption unit 203 obtains the content key K2 by applying the decryption algorithm D1 to the encrypted content key E1 (PK2, K2), using the private key 2 (SK2) as the decryption key. Here, the decryption algorithm D1 is an algorithm for converting an encrypted text, which was encrypted using the encryption algorithm E1, to a plain text.

The first decryption unit 203 outputs the obtained content keys Kt and K2 to he 204.

(4) Second Decryption Unit 204

The second decryption unit 204 receives the encrypted content 180 from the transmission device 10 via the transmission/reception unit 201 and the cable 70. The structure of the encrypted content 180 is shown in FIG. 7. The second decryption unit 204 also receives the content keys Kt and K2 from the first decryption unit 203.

The second decryption unit 204 obtains a content by decrypting the encrypted partial contents contained in the encrypted content 180, using the content keys Kt and K2.

More specifically, the second decryption unit 204 obtains partial contents A, B, C, E, F, . . . by applying the decryption algorithm D2 to the encrypted partial contents E2 (Kt, A), E2 (Kt, B), E2 (Kt, C), E2 (Kt, E), E2 (Kt, F), . . . , using the content key Kt as the decryption key. The second decryption unit 204 also obtains a partial content D2 by applying the decryption algorithm D2 to the encrypted partial content E2 (K2, D2), using the content key K2 as the decryption key. Here, the decryption algorithm D2 is an algorithm for converting an encrypted text, which was encrypted using the encryption algorithm E2, to a plain text.

There is no way for the second decryption unit 204 to know which of the partial contents D1, D2, and D3 can be decrypted using the content key K2. As a result, the second decryption unit 204 may attempt to decrypt the encrypted partial contents E2 (K1, D1), E2 (K2, D2), and E2 (K3, D3), in the stated order.

The second decryption unit 204 outputs the content that is composed of the decrypted partial contents A, B, C, D2, E, F, . . .

3. Key Issuing Device 30

Figure 11:
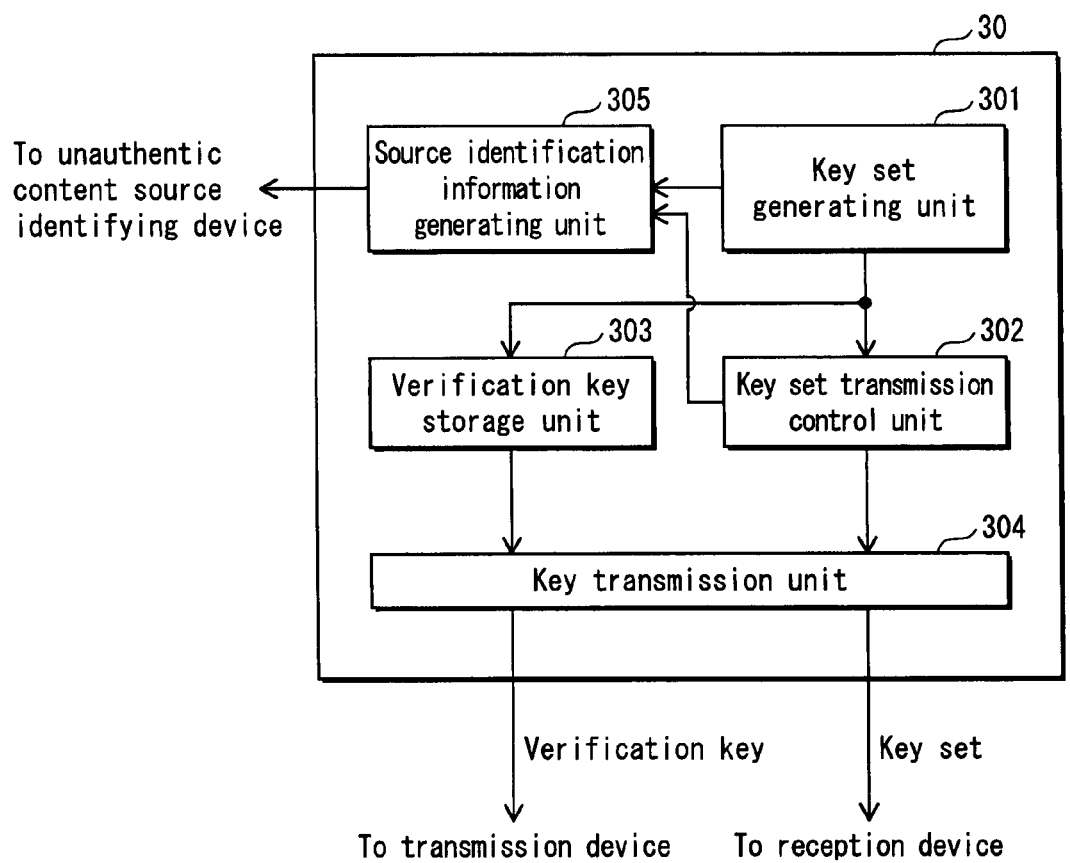
FIG. 11 is a functional block diagram showing the structure of the key issuing device 30 in terms of the functions.

FIG. 11 is a functional block diagram showing the structure of the key issuing device 30.

As shown in FIG. 11, the key issuing device 30 includes a key set generating unit 301, a key set transmission control unit 302, a verification key storage unit 303, a key transmission unit 304, and a source identification information generating unit 305.

The key issuing device 30 is more specifically a computer system including a microprocessor, a ROM, a RAM, a hard disk unit and the like. A computer program is recorded in the ROM, the RAM or the hard disk unit. The key issuing device 30 achieves its functions as the microprocessor operates in accordance with the computer program.

Now, each block constituting the key issuing device 30 will be described.

(1) Key Set Generating Unit 301

The key set generating unit 301 generates certificates and private keys that correspond to the certificates.

The certificates generated by the key set generating unit 301 are the certificate 1 (110), certificate 2 (120), and certificate 3 (130) shown in FIGS. 3A through 3C, respectively.

As one example, here will be described generation of the certificate 1 (110) and the private key SK1. First, the key set generating unit 301 generates ID1 as the public key ID. Next, the key set generating unit 301 generates PK1 as the public key. In doing this, the key set generating unit 301 also generates the private key SK1 that makes a pair with the public key PK1. Lastly, the key set generating unit 301 generates the digital signature SIG1 for ID1 and PK1, using a signature generation key. The key set generating unit 301 then generates the certificate 1 (110) that is composed of ID1, PK1, and SIG1.

Similarly, the key set generating unit 301 generates the certificate 2, private key 2 (SK2), certificate 3, and private key 3 (SK3).

The key set generating unit 301 generates the key set by associating the certificates 1 through 3 with the private key 1 (SK1) through 3 (SK3), respectively. The key set generating unit 301 outputs the generated key set to the key set transmission control unit 302.

The key set generating unit 301 also generates a verification key that correspond to the signature generation key that was used to generate the digital signatures, and outputs the generated verification key to the verification key storage unit 303.

(2) Key Set Transmission Control Unit 302

The key set transmission control unit 302, upon receiving the key set from the key set generating unit 301, generates a key set by adding a flag field in the received key set.

FIG. 12 shows the data structure of a key set 310 stored in the key set transmission control unit 302. Here, the key set 310 is provided with a flag field 311 in which a flag is set for the key set generated by the key set generating unit 301.

The key set transmission control unit 302 transmits the key set to the reception device 20 via the key transmission unit 304 and the network 80. It should be noted here, however, that the key set transmission control unit 302 does not transmit, to the reception device 20, all certificates and all private keys stored therein, but transmits all certificates and one private key.

The key set transmission control unit 302 selects one pair of certificate and private key to transmit to the reception device 20. The key set transmission control unit 302 sets a flag by writing "1" in the flag field that corresponds to the selected pair. In FIG. 12, a flag has been set in the flag field that corresponds to the certificate 2 and the private key 2 (SK2). As a result, the key set transmission control unit 302 transmits, as a pair, only the pair of certificate 2 and private key 2 (SK2) to the reception device 20. That is to say, the data transmitted from the key set transmission control unit 302 to the reception device 20 are the certificate 1, certificate 2, private key 2 (SK2), and certificate 3.

The key set transmission control unit 302 outputs the certificates and private key to be transmitted to the reception device 20, to the key transmission unit 304.

The key set transmission control unit 302 also outputs, to the source identification information generating unit 305, the public key ID "ID1" contained in the certificate 1, the public key ID "ID2" contained in the certificate 2, and the public key ID "ID3" contained in the certificate 3. In doing this, the key set transmission control unit 302 attaches information to the public key ID that is contained in the certificate in the selected pair of certificate and private key (in this example, the public key ID is ID2 because the certificate 2 and the private key 2 have been selected as the pair), where the information notifies the reception device 20 that the certificate 2 and the private key 2 have been selected as the pair, and the key set transmission control unit 302 outputs the public key ID attached with the information, to the source identification information generating unit 305.

(3) Verification Key Storage Unit 303

The verification key storage unit 303, upon receiving the verification key from the key set generating unit 301, stores therein the received verification key. The verification key storage unit 303 transmits the verification key to the transmission device 10 via the key transmission unit 304 and the network 80.

(4) Key Transmission Unit 304

The key transmission unit 304 is the network connection unit, and transmits data to the transmission device 10 and the reception device 20 via the network 80.

More specifically, the key transmission unit 304 transmits the verification key to the transmission device 10, and transmits the key set to the reception device 20. It should be noted here that the key set mentioned here is the key set 210 shown in FIG. 9 that is composed of the certificate 1, certificate 2, private key 2 (SK2), certificate 3, and flag 211.

(5) Source Identification Information Generating Unit 305

The source identification information generating unit 305 receives the public key IDs, namely ID1, ID2, and ID3, from the key set transmission control unit 302. Among these public key IDs, ID2 is attached with information indicating that the certificate 2 and the private key 2 were transmitted as a pair.

The source identification information generating unit 305 generates source identification information 320 shown in FIG. 13, based on the received public key IDs. The source identification information 320 is a table in which public key IDs, which are embedded in pirated contents as electronic watermarks, are associated with source devices of the pirated contents, where the source devices are identified by electronic watermarks.

The source identification information generating unit 305 generates the source identification information 320 by associating ID2, which is attached with information notifying the reception device 20 that the certificate and the private key were transmitted as a pair, with the reception device, and associating the remaining public key IDs (ID1 and ID3) with the transmission device.

The source identification information generating unit 305 transmits the generated source identification information 320 to the unauthentic content source identifying device 50 via the network 80.

4. Unauthentic Content Source Identifying Device 50

Figure 14:
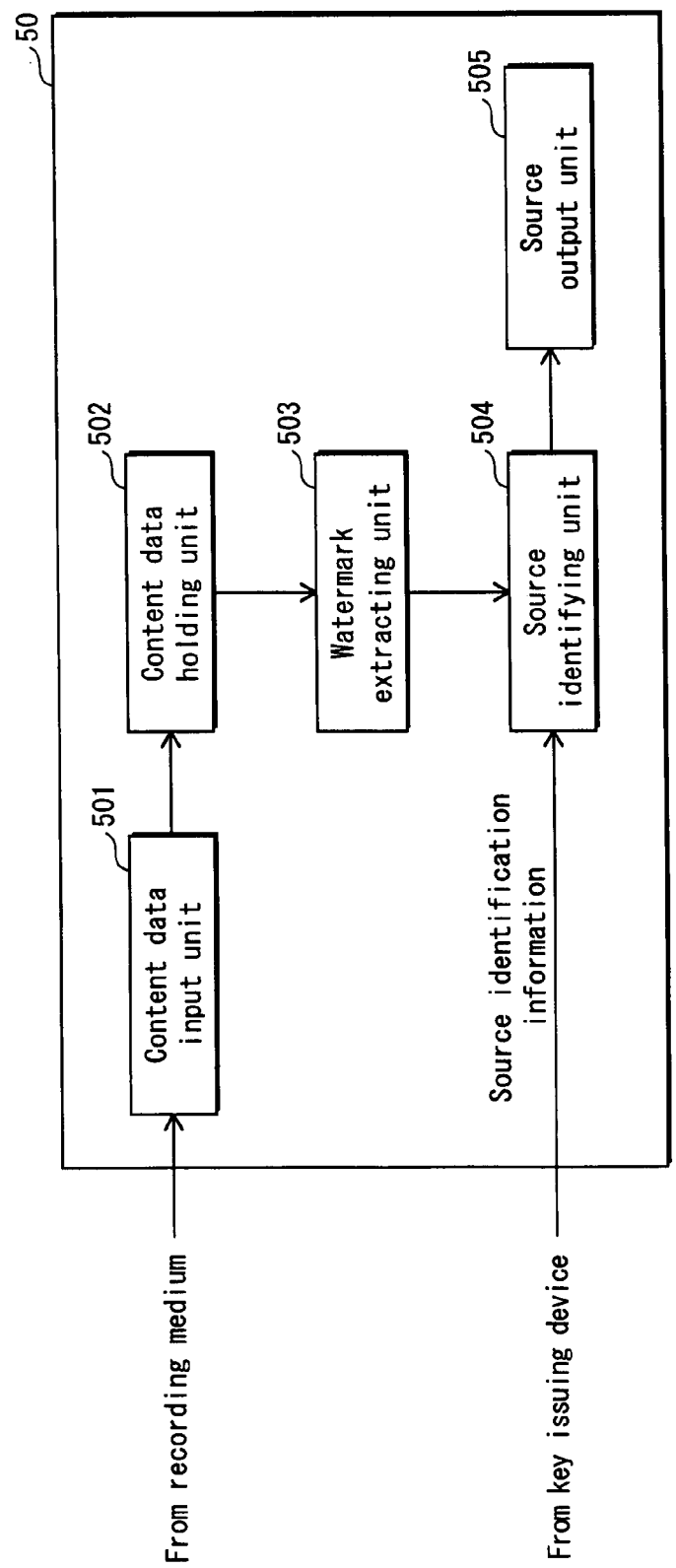
FIG. 14 is a functional block diagram showing the structure of the unauthentic content source identifying device 50 in terms of the functions.

FIG. 14 is a functional block diagram showing the structure of the unauthentic content source identifying device 50.

As shown in FIG. 14, the unauthentic content source identifying device 50 includes a content data input unit 501, a content data holding unit 502, a watermark extracting unit 503, a source identifying unit 504, and a source output unit 505.

The unauthentic content source identifying device 50 is more specifically a computer system including a microprocessor, a ROM, a RAM, a hard disk unit and the like. A computer program is recorded in the ROM, the RAM or the hard disk unit. The unauthentic content source identifying device 50 achieves its functions as the microprocessor operates in accordance with the computer program.

Now, each block constituting the unauthentic content source identifying device 50 will be described.

(1) Content Data Input Unit 501

The content data input unit 501 is more specifically a DVD drive unit, and reads out content data from the recording medium 60, which is a DVD-RAM. The content data input unit 501 outputs the read-out content data to the content data holding unit 502.

Here, the recording medium 60 is a recording medium in which a pirated content generated by unauthorized copying is recorded.

(2) Content Data Holding Unit 502

The content data holding unit 502 receives the content data from the content data input unit 501, and stores the received content data thereinto.

(3) Watermark Extracting Unit 503

The watermark extracting unit 503 extracts an electronic watermark from the content data stored in the content data holding unit 502. The process of extracting an electronic watermark can be achieved using a known technology, and description thereof is omitted here.

The watermark extracting unit 503 outputs the electronic watermark extracted from the content data to the source identifying unit 504.

(4) Source Identifying Unit 504

The source identifying unit 504 preliminarily receives the source identification information 320 from the key issuing device 30 via the network 80, and stores the received source identification information 320 thereinto. The data structure of the source identification information 320 is shown in FIG. 13.

The source identifying unit 504 receives, from the watermark extracting unit 503, the electronic watermark that had been embedded in the content data that is a pirated content.

The source identifying unit 504 identifies the source of the pirated content from the electronic watermark and the source identification information 320. More specifically, the source identifying unit 504 identifies the source of the pirated content as a device that is associated with the electronic watermark in the source identification information 320. In this example, the source identifying unit 504 refers to the source identification information 320, and when the electronic watermark extracted from the pirated content is either of ID1 and ID3, the source identifying unit 504 identifies the source of the pirated content as the transmission device 10; and when the electronic watermark extracted from the pirated content is ID2, the source identifying unit 504 identifies the source of the pirated content as the reception device 20.

The source identifying unit 504 outputs the name of the identified source of the pirated content to the source output unit 505.

Here will be described the reason why it is possible to identify the device that is the source of a pirated content, from the electronic watermark embedded in the pirated content.

The private key held by the reception device 20 is only the private key 2 (SK2) that makes a pair with the public key PK2. As a result, the reception device 20 can obtain an original content by decrypting an encrypted content that is composed of the partial contents A, B, C, D2, E, F, . . . , using the corresponding private key SK2. On the other hand, the reception device 20 cannot obtain an original content by decrypting an encrypted content that is composed of the partial contents A, B, C, D1, E, F, . . . , or composed of the partial contents A, B, C, D3, E, F, . . . , since the reception device 20 does not have the corresponding private key. That is to say, only "ID2" has been embedded, as an electronic watermark, but no other electronic watermarks have been embedded in each content obtained by the reception device 20.

On the other hand, the transmission device 10 receives three pieces of certificates from the reception device 20, but does not know which certificate, among the received certificates, corresponds to the private key held by the reception device 20. The transmission device 10 therefore cannot identify a content that the reception device 20 can obtain by decrypting and encrypted content. It is therefore impossible for the transmission device 10 to disguise the reception device 20 and distribute copies of only the content composed of the partial contents A, B, C, D2, E, F, . . . Once the transmission device 10 distributes a copy of a content that includes a partial content (D1 or D3) other than D2, it becomes an evidence that the transmission device 10 performed the unauthorized act, and it would be extremely difficult for the transmission device 10 to distribute only D2 by preventing a partial content (D1 or D3) other than D2 from being distributed.

For the reason stated above, it is possible to identify the reception device 20 as the source of the pirated content when the public key ID contained in the pirated content is ID2, and to identify the transmission device 10 as the source of the pirated content when the public key ID contained in the pirated content is ID1 or ID3.

(5) Source Output Unit 505

The source output unit 505 includes a display.

The source output unit 505, upon receiving the device name of the source of the pirated content from the source identifying unit 504, generates screen information containing the received device name of the source of the pirated content, and outputs the generated screen information onto the display.

Figure 15:
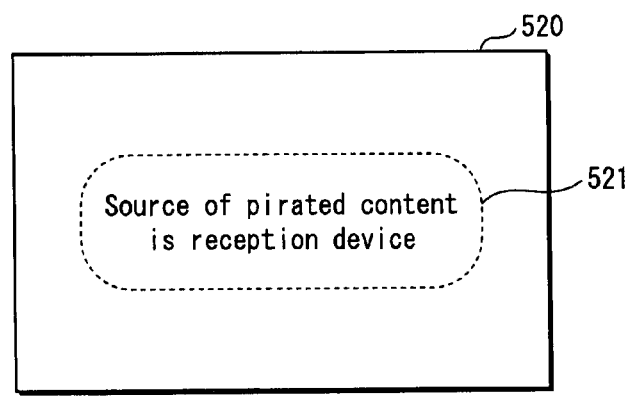
FIG. 15 shows screen information 520 that is output to the source output unit 505.

For example, when the source output unit 505 receives "reception device" as the device name of the source of the pirated content, the source output unit 505 generates screen information 520 shown in FIG. 15. The screen information 520 contains a comment: "Source of pirated content is reception device". It should be noted that the screen information 520 shown here is merely an example.

<Operation>

Figure 16:
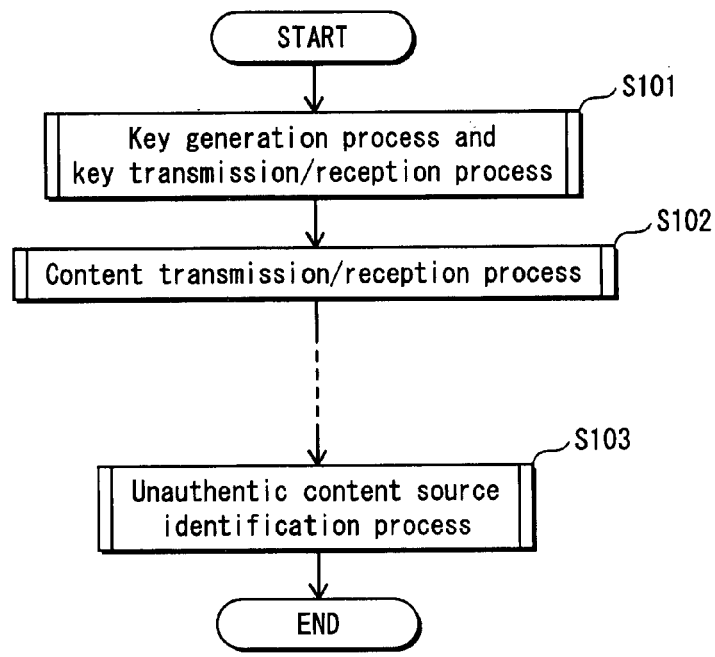
FIG. 16 is a flowchart showing the operation of the overall content distribution system 1.

FIG. 16 is a flowchart showing the operation of the overall content distribution system 1.

First, the content distribution system 1 performs the key generation process and the key transmission/reception process (step S101).

Next, the content distribution system 1 performs the content transmission/reception process (step S102).

If a pirated content is found to be distributed, the content distribution system 1 performs the unauthentic content source identification process (step S103).

2. Operation in Key Generation Process and Key Transmission/Reception Process

Figure 17:
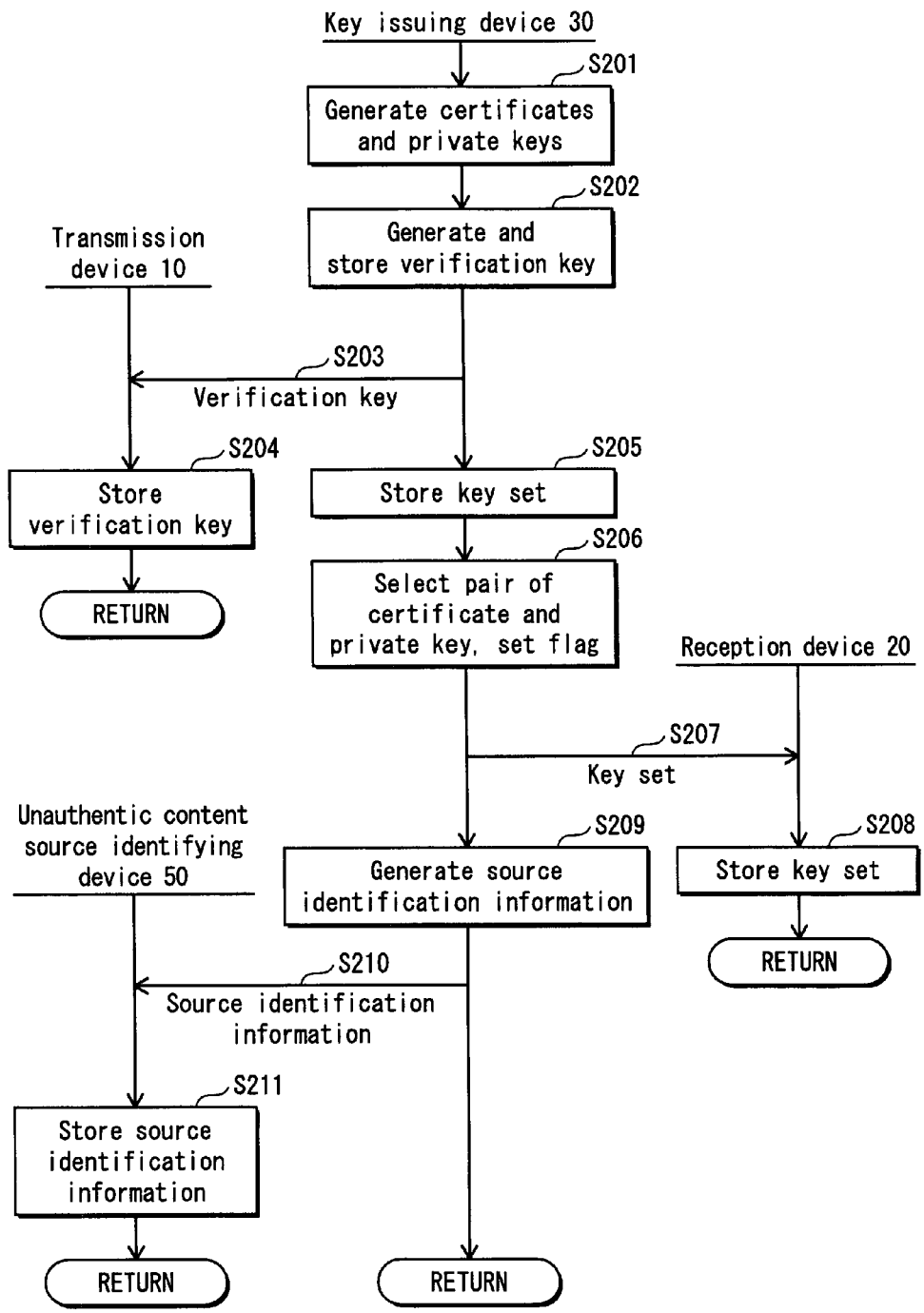
FIG. 17 is a flowchart showing the operation of the key generation process and the key transmission/reception process.

FIG. 17 is a flowchart showing the operation of the content distribution system 1 in the key generation process and the key transmission/reception process. The operation described here is a detail of step S101 shown in the flowchart of FIG. 16.

The key set generating unit 301 of the key issuing device 30 generates certificates and private keys (step S201). More specifically, the key set generating unit 301 generates the certificate 1, private key 1 (SK1), certificate 2, private key (SK2), certificate 3, and private key 3 (SK3). The data structure of the certificates 1 through 3 is shown in FIG. 3. Next, the key set generating unit 301 generates verification key for verifying the digital signatures (SIG1, SIG2, and SIG3) contained in the certificates generated in step S201. The verification key storage unit 303 stores therein the generated verification key (step S202).

The key transmission unit 304 of the key issuing device 30 transmits the verification key to the transmission device 10 via the network 80, and the transmission/reception unit 102 of the transmission device 10 receives the verification key (step S203). The verification key storage unit 103 of the transmission device 10 stores the received verification key (step S204).

The key set transmission control unit 302 of the key issuing device 30 generates and stores a key set in which the certificates and private keys generated in step S201 are associated with each other (step S205).

Then, the key set transmission control unit 302 selects one pair of certificate and private key to transmit to the reception device 20, and sets a flag in the flag field that corresponds to the selected pair (step S206).

The following describes a case where, as shown in FIG. 12, the key set transmission control unit 302 selects the certificate 2 and private key 2 (SK2) as the pair to be transmitted to the reception device 20.

The key transmission unit 304 of the key issuing device 30 transmits a key set, which is composed of the certificate 1, certificate 2, private key 2 (SK2), and certificate 3, to the reception device 20 via the network 80, and the transmission/reception unit 201 of the reception device 20 receives the key set (step S207). The key set storage unit 202 of the reception device 20 stores therein the key set received in step S207 (step S208).

Following this, the key set transmission control unit 302 of the key issuing device 30 outputs the public key IDs "ID1", "ID2", and "ID3" to the source identification information generating unit 305. Here, "ID2" is attached with information indicating that a certificate identified by "ID2" was selected in step S206.

The source identification information generating unit 305 generates the source identification information 320 shown in FIG. 13 by associating "ID1" and "ID3" with the transmission device 10, and associating "ID2", to which the above-mentioned information is attached, with the reception device 20 (step S209).

The source identification information generating unit 305 transmits the generated source identification information 320 to the unauthentic content source identifying device 50 via the network 80, and the source identifying unit 504 of the unauthentic content source identifying device 50 receives the source identification information 320 (step S210). The source identifying unit 504 stores the source identification information 320 (step S211).

3. Operation in Content Transmission/Reception Process

Figure 18:
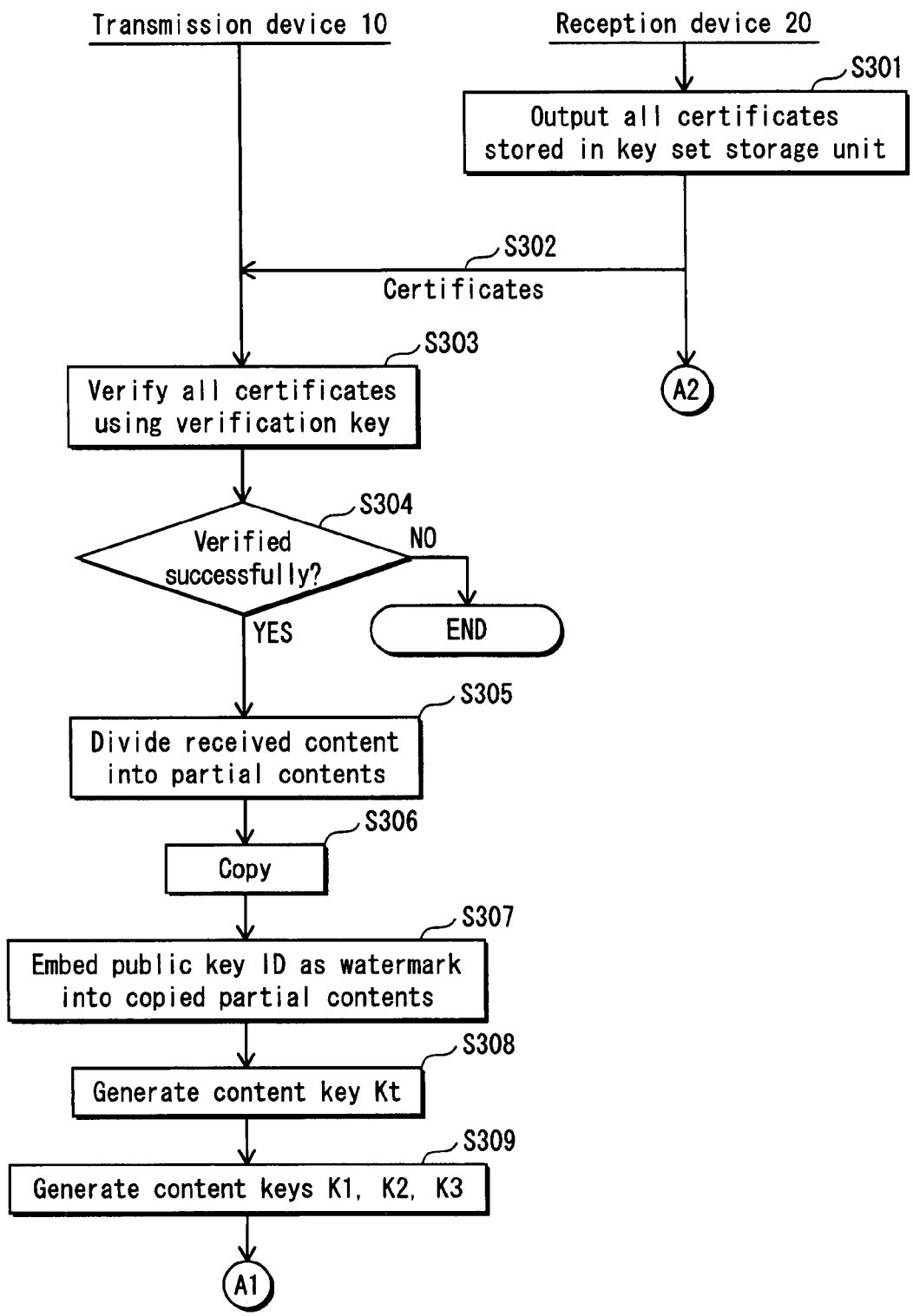
FIG. 18 is a flowchart showing the operation of the content transmission/reception process, continued to FIG. 19.
Figure 19:
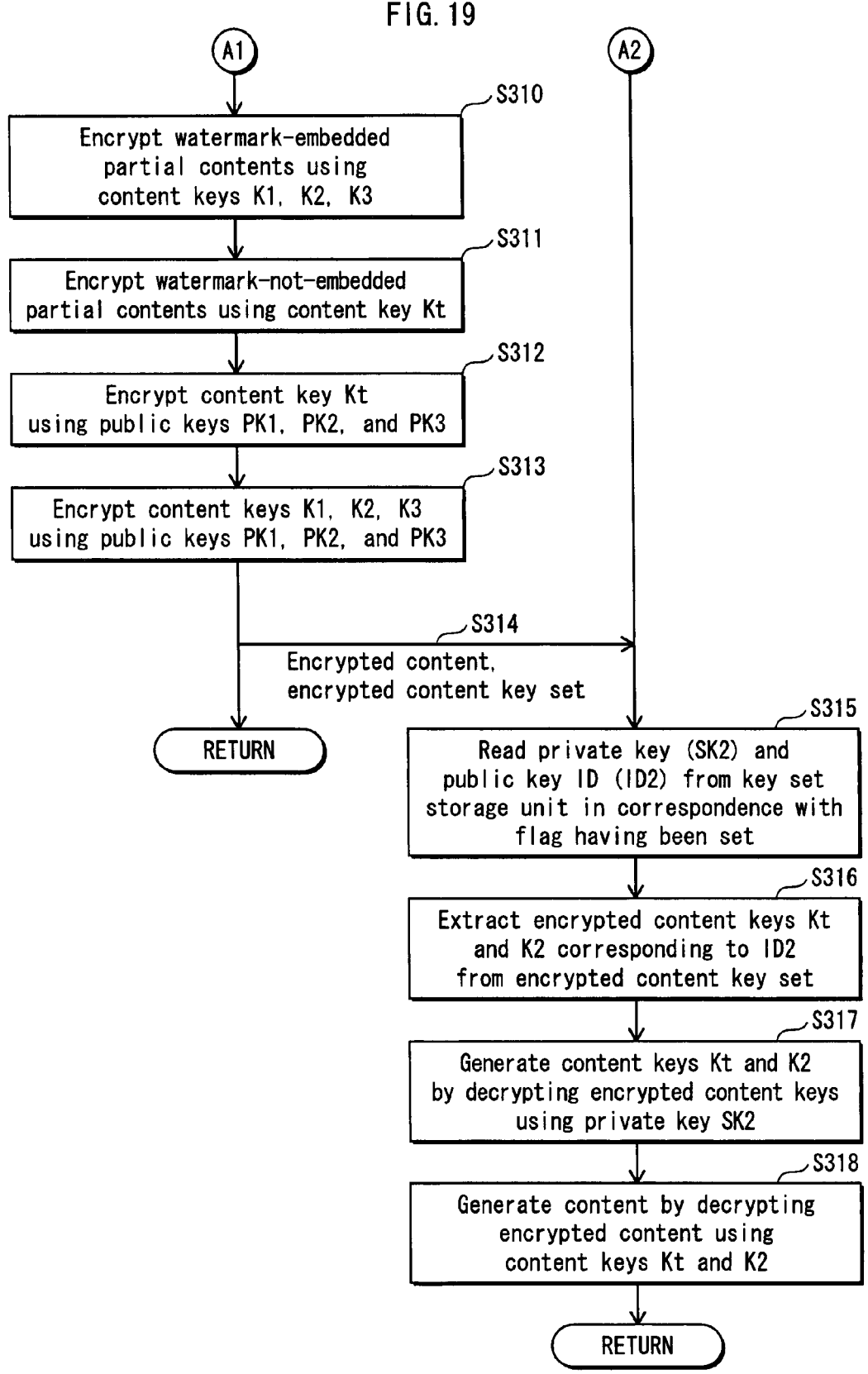
FIG. 19 is a flowchart showing the operation of the content transmission/reception process, continued from FIG. 18.

FIGS. 18 and 19 are flowcharts showing the operation of the content distribution system 1 in the content transmission/reception process. The operation described here is a detail of step S102 shown in the flowchart of FIG. 16.

First, the key set storage unit 202 of the reception device 20 outputs all the certificates (certificate 1, certificate 2, and certificate 3) stored therein to the transmission/reception unit 201 (step S301). The transmission/reception unit 201 transmits the certificate 1, certificate 2, and certificate 3 to the transmission device 10 via the cable 70, and the transmission/reception unit 102 of the transmission device 10 receives the certificate 1, certificate 2, and certificate 3 (step S302).

The certificate verifying unit 104 of the transmission device 10 receives the certificate 1, certificate 2, and certificate 3 from the transmission/reception unit 102, and further reads out the verification key from the verification key storage unit 103. The certificate verifying unit 104 verifies all the certificates using the verification key (step S303). More specifically, the certificate verifying unit 104 extracts digital signatures SIG1, SIG2, and SIG3 respectively from the certificate 1, certificate 2, and certificate 3. The certificate verifying unit 104 verifies the authenticity of each digital signature by applying a signature verification algorithm to each of the digital signatures SIG1, SIG2, and SIG3 using the verification key.

When, in step S303, the certificate verifying unit 104 fails to verify the authenticity of one or more digital signatures (NO in step S304), the transmission device 10 ends the process.

When, in step S303, the certificate verifying unit 104 succeeds to verify all the digital signatures (YES in step S304), the certificate verifying unit 104 outputs the public key IDs (ID1, ID2, and ID3) contained in each certificate to the content dividing/copying unit 105 and the watermark embedding unit 106, and outputs the public keys (PK1, PK2, and PK3) contained in each certificate to the first encryption unit 108.

Upon receiving the public key IDs from the certificate verifying unit 104, the content dividing/copying unit 105 divides the content into a plurality of partial contents as shown in FIG. 4A (step S305).

Next, the content dividing/copying unit 105 copies the partial content D and thereby generates as many partial contents D as the number of (three) public keys received from the certificate verifying unit 104 as shown in FIG. 4B (step S306). The content dividing/copying unit 105 outputs the content including the three copies of partial content D to the watermark embedding unit 106.

Upon receiving the content including the three copies of partial content D from the content dividing/copying unit 105, the watermark embedding unit 106 generates three partial contents D1, D2, and D3 by embedding the three public key IDs received from the certificate verifying unit 104, as electronic watermarks, into the three partial contents D, respectively (step S307). The watermark embedding unit 106 outputs the content, with the electronic watermarks embedded therein, to the second encryption unit 109.

Next, the content key generating unit 107 generates content key Kt (step S308), and generates content keys K1, K2, and K3 (step S309). The content key generating unit 107 outputs the generated content keys Kt, K1, K2, and K3 to the first encryption unit 108 and the second encryption unit 109.

The second encryption unit 109 receives the content from the watermark embedding unit 106, and receives the content keys K1, K2, and K3 from the content key generating unit 107.

The second encryption unit 109 encrypts the partial contents D1, D2, and D3, in which electronic watermarks are embedded, respectively using the content keys K1, K2, and K3 (step S310). The second encryption unit 109 also encrypts watermark-not-embedded partial contents using content key Kt (step S311).

The above-described steps S310 and S311 result in generation of the encrypted content 180 shown in FIG. 7.

The first encryption unit 108 receives the public keys PK1, PK2, and PK3 from the certificate verifying unit 104, and receives the content keys Kt, K1, K2, and K3 from the content key generating unit 107.

The first encryption unit 108 generates three encrypted content keys E1 (PK1,Kt), E1 (PK2,Kt), and E1 (PK3,Kt) by encrypting the content key Kt using the public keys PK1, PK2, and PK3 as the encryption keys (step S312).

Next, the first encryption unit 108 generates encrypted content keys E1 (PK1,K1), E1 (PK2,K2), and E1 (PK3,K3) by encrypting the content keys K1, K2, and K3 using the public keys PK1, PK2, and PK3 as the encryption keys, respectively (step S313).

The above-described steps S312 and S313 result in generation of the encrypted content key set 170 shown in FIG. 6.

The transmission/reception unit 102 of the transmission device 10 receives the encrypted content key set from the first encryption unit 108, and receives the encrypted content 180 from the second encryption unit 109.

The transmission/reception unit 102 transmits the encrypted content key set 170 and the encrypted content 180 to the reception device 20 via the cable 70, and the transmission/reception unit 201 of the reception device 20 receives the encrypted content key set 170 and the encrypted content 180 (step S314).

The transmission/reception unit 201 outputs the received encrypted content key set 170 to the first decryption unit 203, and outputs the received encrypted content 180 to the second decryption unit 204.

Next, the first decryption unit 203 reads out public key ID (ID2) and private key (SK2) from certificate 2, in which the flag has been set, contained in the key set 210 stored in the key set storage unit 202 (step S315).

The first decryption unit 203 extracts, from the encrypted content key set 170, the encrypted content keys E1 (PK2,Kt) and E1 (PK2,K2) that are identified by the public key ID (ID2) read out in step S315 (step S316).

The first decryption unit 203 generates content keys Kt and K2 by decrypting the encrypted content keys E1 (PK2,Kt) and E1 (PK2,K2) using the private key 2 (SK2) as the decryption key (step S317). The first decryption unit 203 outputs the generated content keys Kt and K2 to the second decryption unit 204.

Following this, the second decryption unit 204 generates partial contents A, B, C, E, F, . . . by decrypting, among the encrypted partial contents contained in the encrypted content 180, the encrypted partial contents E2 (Kt,A), E2 (Kt, B), E2 (Kt, C), E2 (Kt,E), E2 (Kt,F), . . . , in which no electronic watermark has been embedded, using the content key Kt as the decryption key. The second decryption unit 204 also generates the partial content D2 by decrypting, among the encrypted partial contents E2 (K1,D1), E2 (K2,D2), and E2 (K3,D3) in which electronic watermarks have been embedded, the partial content E2 (K2,D2) using the content key K2 as the decryption key.

With these steps, the reception device 20 obtains a content that is composed of partial contents A, B, C, D2, E, F, . . . (step S318).

4. Operation in Unauthentic Content Source Identification Process

Figure 20:
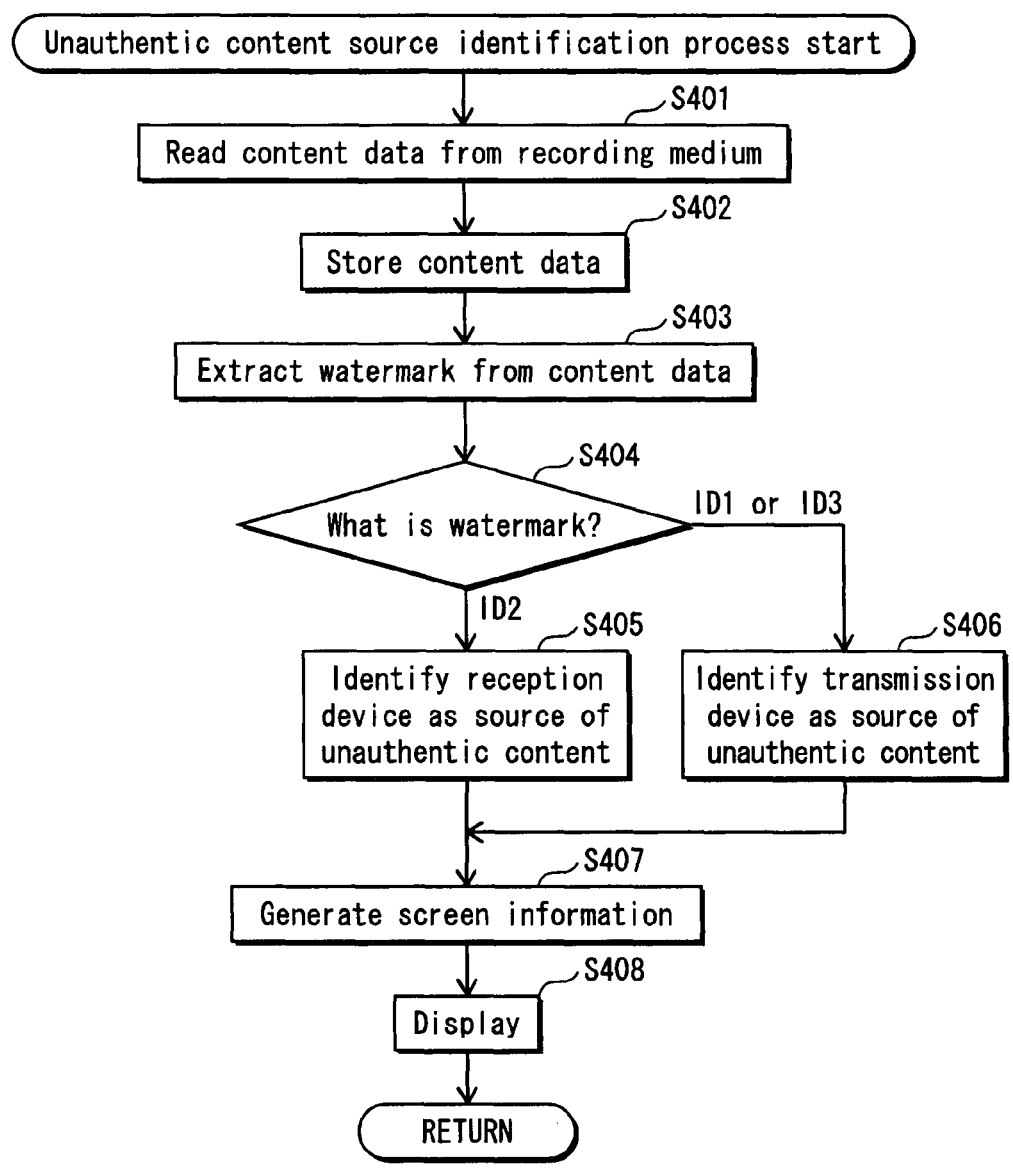
FIG. 20 is a flowchart showing the operation of the unauthentic content source identification process.

FIG. 20 is a flowchart showing the operation of the content distribution system 1 in the unauthentic content source identification process. The operation described here is a detail of step S103 shown in the flowchart of FIG. 16.

The unauthentic content source identification process is performed when it is found that the recording medium 60 with a pirated content recorded therein has been distributed, to identify the device that conducted the unauthorized act.

First, the content data input unit 501 of the unauthentic content source identifying device 50 reads out content data from the recording medium 60 (step S401), and outputs the content data to the content data holding unit 502. The content data holding unit 502 stores therein the content data (step S402).

Next, the watermark extracting unit 503 extracts the electronic watermark from the content data stored in the content data holding unit 502 (step S403), and outputs the extracted electronic watermark to the source identifying unit 504.

The source identifying unit 504 preliminarily obtains the source identification information 320 shown in FIG. 13 from the key issuing device 30, and stores it therein.

Upon receiving the public key ID, which was extracted from the pirated content, from the watermark extracting unit 503, the source identifying unit 504 determines which, among ID1, ID2, and ID3, is the received public key ID.

When it determines from the source identification information 320 that the received public key ID is "ID1" or "ID3" (ID1 or ID3 in step S404), the source identifying unit 504 identifies the transmission device 10 as the source of the pirated content (step S406). When it determines that the received public key ID is "ID2" (ID2 in step S404), the source identifying unit 504 identifies the reception device 20 as the source of the pirated content (step S405).

The source identifying unit 504 outputs the name of the device identified as the source of the pirated content to the source output unit 505.

The source output unit 505 generates screen information that includes the name of the source of the pirated content (step S407), and displays the generated screen information on the display (step S408).

<<Modifications>>

The present invention, which has been described through an embodiment up to now, is not limited to the embodiment, but includes, for example, the following modifications as well.

(1) In the above-described embodiment, contents are transferred between one transmission device 10 and one reception device 20. However, not limited to such a peer-to-peer content transmission/reception, the present invention may be applied to a structure where contents are transferred from one server device to a plurality of client devices.

(2) In the above-described embodiment, the transmission device 10 divides a content into partial contents, and copies part of the partial contents and thereby generates a plurality of copies of the part of the partial contents, and embeds public key identifiers into the plurality of copies of the part of the partial contents. However, not limited to this structure, the present invention may have a structure in which the transmission device 10 copies a whole content and thereby generates a plurality of copies of the whole content, and embeds public key identifiers into the generated plurality of contents, respectively.

(3) The above-described embodiment provides one example of content that contains moving picture data in which video data and audio data have been multiplexed. However, the content according to the concept of the present invention includes various types of digital data.

The content for the present invention may be, for example, a moving picture, still picture, photograph, music, game, computer program, electronic map, electronic medical chart, or a document, image, text data or the like having been created by Word, PowerPoint, PDF (Portable Document Format) or the like. It should be noted here that the technology for embedding an electronic watermark into text data is well known.

Further, the content for the present invention is not limited to the content that the reception device 20 obtains from an external broadcast station device 40, but may be the content that the reception device 20 preliminarily holds. That is to say, the content for the present invention conceptually includes a private content such as a photograph or image that a person holds.

Further, when the present invention is structured in a server-client system, the content for the present invention may be a bulletin board, SNS (Social Networking Service) or the like.

(4) In the above-described embodiments, contents are transferred between the transmission device 10 and the reception device 20, using the cable 70 being a communication path. However, the structure where contents are transferred using a communication path is not indispensable for the present invention. In the present invention, contents may be transferred using a recording medium such as a DVD-RAM or SD card, not using a communication path.

Further, in the above-described embodiment, stationary devices are used for the transmission device 10 and the reception device 20, as one example. However, not limited to this, the transmission device 10 and the reception device 20 of the present invention may be, for example, portable devices that can be transported, or software in computers.

(5) In the above-described embodiment, the key issuing device 30 transmits the key set 210 shown in FIG. 9 to the reception device 20, as one example. However, the key issuing device 30 of the present invention may transmit the key set 220 shown in FIG. 10.

In this case, the key set generating unit 301 or the key set transmission control unit 302 of the key issuing device 30 generates dummy private key 1 (dummy SK1) and dummy private key 3 (dummy SK3) in place of the private key 1 (SK1) and private key 3 (SK3), and transmits, to the reception device 20, the key set 220 that includes the generated dummy private key 1 and dummy private key 3.

(6) In the above-described embodiment, the reception device 20 holds three public key certificates, as one example. However, the number of public key certificates held by the reception device 20 of the present invention is not limited to three.

(7) The above-described embodiment adopts a structure where the reception device 20 uses a flag to identify a certificate associated with an authorized private key that is held by the reception device 20 itself, the flag being set in the key set 210 shown in FIG. 9 and the key set 220 shown in FIG. 10. However, using a flag for the identification is not an indispensable structure for the present invention.

The reception device 20 may hold information for identifying the authorized private key, in an area different from an area in which the key set is stored. With this arrangement, the reception device 20 prevents the authorized private key from being identified easily by an outsider when the key set storage unit 202 is analyzed by the outsider.

(8) The overall content distribution system 1 in the above-described embodiment has a structure where contents circulate over a plurality of copyright protection systems.

More specifically, the broadcast station device 40, which broadcasts digital terrestrial broadcasts in Japan, transmits a content by protecting the content by the B-CAS (BS-Conditional Access System) which is a copyright protection standard for broadcasting, and the transmission device 10, which is an authorized TV receiver, removes the protection by the B-CAS from the content, and displays the content on the display.

When transmitting a content to the reception device 20, the transmission device 10 removes the protection by the B-CAS from the content, and re-protects the content by the DTCP (Digital Transmission Content Protection) which is a copyright protection standard of IEEE1394. The transmission device 10 then transmits the content to the reception device 20 using a cable conforming to the IEEE1394 (the cable 70).

Upon receiving the content, if it is to record the received content onto a DVD-RAM medium, the reception device 20 removes the protection by the DTCP from the content, and re-protects the content by the CPRM (Content Protection for Recordable Media) which is a copyright protection standard for DVD-RAM. The reception device then records the content onto the DVD-RAM medium.

The above-mentioned B-CAS, DTCP, and CPRM are copyright protection standards that are managed by different associations. Accordingly, if a content having been copied in an unauthorized manner is found in the system, it is first necessary to detect which content protection standard has been analyzed by the unauthorized user.

With the present invention, it is possible to identify the device that generated a pirated content, and it is further possible to identify a copyright protection standard that was analyzed by a user.

(9) In the above-described embodiment, the transmission device 10 receives the verification key from the key issuing device 30. However, the present invention is not limited to this structure. The verification key may be preliminarily written to the transmission device 10 when it is manufactured. In this case, the transmission device 10 need not be connected to the key issuing device 30 on the network.

(10) The above-described embodiment discloses a structure where the unauthentic content source identifying device 50 identifies the device that is the source of a pirated content, from a public key ID extracted from the pirated content. That is to say, the source identifying unit 504 of the unauthentic content source identifying device 50 identifies the source of a pirated content as the reception device 20 when the public key ID embedded in the pirated content is "ID2", and identifies the source of a pirated content as the transmission device 10 when the public key ID embedded in the pirated content is "ID1" or "ID3", based on the source identification information 320 shown in FIG. 13. However, the present invention is not limited to this structure.

The present invention may have a structure where the unauthentic content source identifying device 50 obtains a plurality of pirated contents, extracts electronic watermarks from the extracted pirated contents, and identifies a device that is the source of the pirated contents.

More specifically, the unauthentic content source identifying device 50 extracts a plurality of public key IDs from a plurality of pirated contents, and identifies the source of the pirated contents as the transmission device 10 when the extracted public key IDs include "ID1", "ID2", and "ID3", and identifies the source of the pirated contents as the reception device 20 when the extracted public key IDs are all "ID2". This is because the reception device 20 cannot obtain a content in which "ID1" or "ID3" is embedded, and only the transmission device 10 holds a content in which "ID1", "ID2", and "ID3" are embedded.

Figure 21:
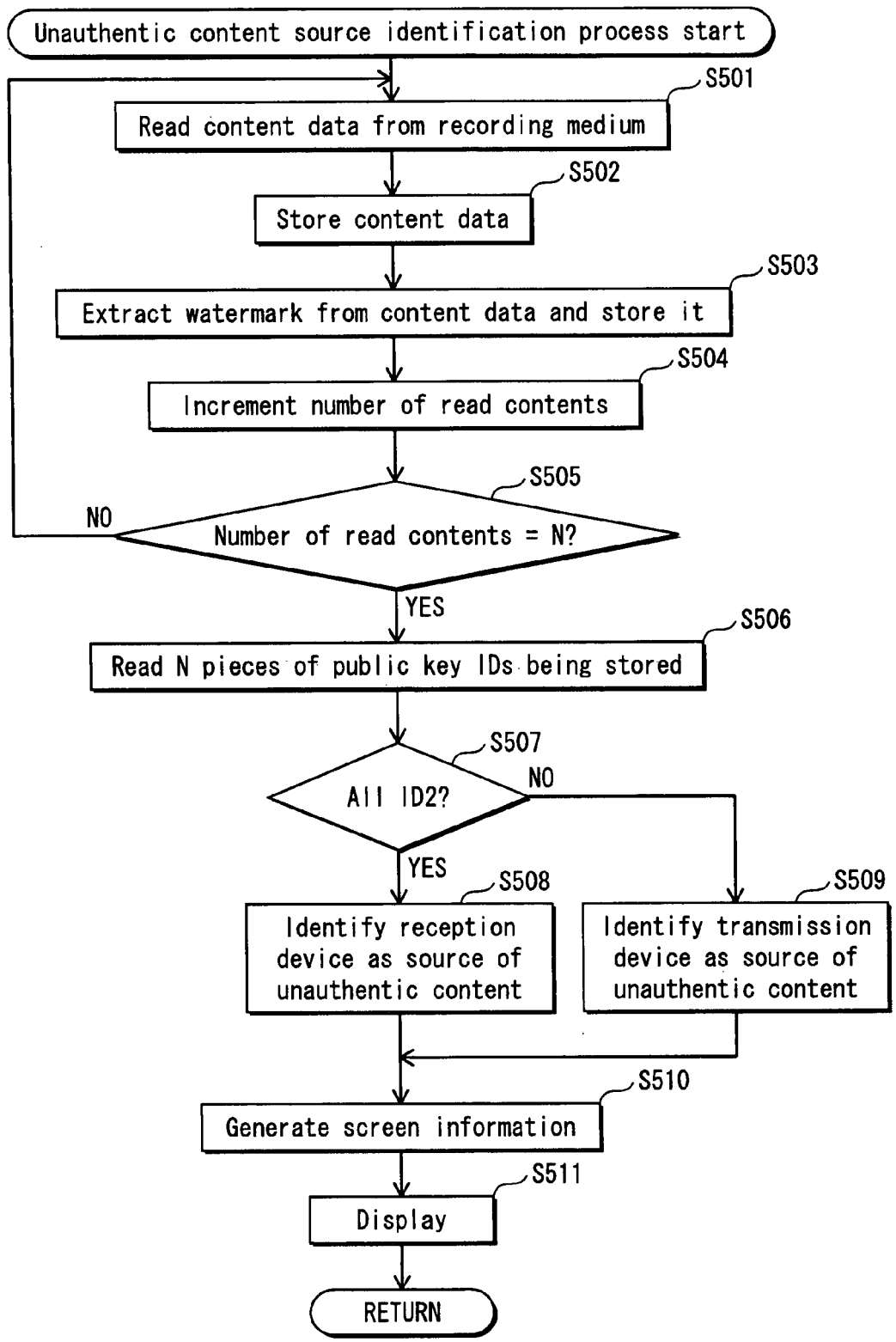
FIG. 21 is a flowchart showing the operation of the unauthentic content source identification process in a modification.

FIG. 21 is a flowchart showing the operation of the unauthentic content source identifying device 50 in the unauthentic content source identification process.

It is presumed here that the unauthentic content source identifying device 50 preliminarily holds therein a predetermined number "N".

The unauthentic content source identifying device 50 reads content data from the recording medium in which a pirated content is recorded (step S501), and stores therein the read content data (step S502).

The unauthentic content source identifying device 50 extracts, from the stored content data, a public key ID that is embedded therein as an electronic watermark, and stores therein the extracted public key ID (step S503). The unauthentic content source identifying device 50 then increments the number of read contents that indicates the number of read pirated contents (step S504).

The unauthentic content source identifying device 50 judges whether or not the number of read contents matches N. When the number of read contents does not match N (NO in step S505), the unauthentic content source identifying device 50 returns to step S501 and continues the process. When the number of read contents matches N (YES in step S505), the unauthentic content source identifying device 50 reads N pieces of public key IDs stored therein (step S506).

The unauthentic content source identifying device 50 then judges whether the read N pieces of public key IDs are all "ID2" or include "ID1", "ID2", and "ID3".

When the N pieces of public key IDs are all "ID2" (YES in step S507), the unauthentic content source identifying device 50 identifies the reception device 20 as the source of the unauthentic content (step S508).

When the N pieces of public key IDs include "ID1", "ID2", and "ID3" (NO in step S507), the unauthentic content source identifying device 50 identifies the transmission device 10 as the source of the unauthentic content (step S509).

After this, the unauthentic content source identifying device 50 generates screen information indicating the source of the unauthentic content (step S510), and outputs the generated screen information onto the display (step S511).

(10) In the present invention, the public key identifier itself may not be embedded in the content as an electronic watermark in so far as the public key identifier is associated with information embedded as an electronic watermark in the content.

For example, the present invention may have the following structure. The key issuing device generates "ID1→97, ID2→25, ID3→52" as a correspondence table, and sends the correspondence table to the reception device together with a key pair. The reception device sends the correspondence table to the transmission device. The transmission device embeds values "97", "25", and "52", which correspond to the keys, into the contents as electronic watermarks.

(11) The present invention may be a system which includes a plurality of reception devices, and in the system, a transmission device embeds electronic watermarks into a plurality of partial contents.

For example: a reception device that holds a private key corresponding to ID1 obtains partial contents A, B, C, D9, E7, F, . . . ; a reception device that holds a private key corresponding to ID2 obtains partial contents A, B, C, D2, E5, F, . . . ; and a reception device that holds a private key corresponding to ID3 obtains partial contents A, B, C, D5, E2, F, . . . This structure reduces the number of contents that are generated by the transmission device.

Here, the transmission device may embed the same electronic watermark into a plurality of positions, instead of only one position.

For example: a reception device corresponding to ID1 obtains partial contents A, B, C, D1, E1, F, . . . ; a reception device corresponding to ID2 obtains partial contents A, B, C, D2, E2, F, . . . ; and a reception device corresponding to ID3 obtains partial contents A, B, C, D3, E3, F, . . . With this structure, if an error occurs while the unauthentic content source identifying device is reading an electronic watermark, the unauthentic content source identifying device can track the device that is the source of the unauthentic content, with a high probability of success.

(12) In the present invention, the electronic watermark embedded in the content may not be the public key identifier itself, but may be part thereof. For example, the lower 10 bits of the public key identifier may be embedded. In this case, there is a possibility that the same electronic watermark is embedded from two or more different public key identifiers, and this may make it impossible to identify the source of the pirated content only by one performance of the unauthentic content source identification process. Nonetheless, it is possible to narrow down the source by repeating, a plurality of times, the unauthentic content source identification process and finally identify the unauthentic content source uniquely. The merits of this structure are: (a) if a third party extracts the electronic watermark from the content, the third party cannot grasp the whole of the public key identifier that contains the watermark as part, which contributes to the protection of privacy, and (b) even if the electronic watermark embedding technology is given some restriction (for example, only up to several tens of bits can be embedded), the same advantageous effects as in the above-described embodiment can be achieved.

(13) In the present invention, the electronic watermark embedded in the content may not be the public key identifier itself, but may be encrypted one. For example, the public key identifier may be encrypted using a public key of the server device (or a common key in the common key encryption method), and the encrypted public key identifier may be embedded. With this structure, if a third party extracts the electronic watermark from the content, the third party cannot grasp the public key identifier and cannot determine the private key that is held by the reception device.

This enables a safer content circulation to be achieved. Further, by using a probability encryption (such as the ElGamal encryption) as the public key encryption method, it is possible to achieve a higher security since a different encrypted text is output every time the same message is encrypted.

(14) The electronic watermark technology used in the above-described embodiment is not limited to the symmetric electronic watermark technology in which an algorithm for embedding an watermark can be estimated from an algorithm for extracting the watermark, but may be the asymmetric electronic watermark technology in which an algorithm for embedding an watermark cannot be estimated from an algorithm for extracting the watermark.

In this case, it is further possible to allow the unauthentic content source identifying device to have only the algorithm for extracting the watermark, and allow the transmission device to have only the algorithm for embedding the watermark, thus preventing the algorithm for embedding the watermark from being leaked from the unauthentic content source identifying device. With this structure, a higher safety can be achieved.

(15) In the present invention, the electronic watermark to be embedded into the content may be information for identifying the transmission device and/or the reception device (for example, the copyright protection system ID or the terminal ID). Also, this information may be added to the header or footer of the content. This makes it easier for the unauthentic content source identifying device to track the source device of the pirated content.

(16) The present invention is adaptable to a system in which the reception device transfers a content to another reception device.

In this case, a plurality of electronic watermarks may be embedded into the same content so that the source device of the pirated content can be tracked in the same way as in the above-described embodiments.

Further, in this case, the following modifications are possible.

(a) Information indicating the number of generations or the number of copies may be added to the content.

(b) The transmission device may detect portions in which no electronic watermark is embedded, and embed electronic watermarks into the detected portions.

(c) Electronic watermarks may be embedded into portions whose positions are uniquely determined from the information (for example, terminal ID) about the transmission device and reception device, using, for example, a one-way function.

(d) Electronic watermarks may be embedded in order (A, B, C, . . . ) from the start of the content.

(e) Each reception device may use a different electronic watermark embedding technology. Alternatively, each reception device may use a different electronic watermark embedding parameter (for example, frequency band).

(f) Any of (a) through (e) described above may be combined with each other. For example, in the same content protection system, electronic watermarks may be embedded in order (A, B, C, . . . ) from the start of the content, and in different content protection systems, different electronic watermark embedding systems may be used, respectively.

(17) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording mediums.

Furthermore, the present invention may be the computer program or the digital signal transmitted on an electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(18) Part or all of constituent elements constituting each of the above-described devices may be achieved in a system LSI (Large Scale Integration). The system LSI is an ultra multi-functional LSI that is manufactured by integrating a plurality of components on one chip. More specifically, the system LSI is a computer system that includes a microprocessor, ROM, and RAM. A computer program is stored in the RAM. The microprocessor operates in accordance with the computer program, thereby enabling the system LSI to achieve its functions. Also, the integrated circuit may not necessarily be achieved by the LSI, but may be achieved by a dedicated circuit. Also, the system LSI may be replaced with the FPGA (Field Programmable Gate Array) that can be re-programmed after the LSI is manufactured, or the reconfigurable processor that can re-configure the connection or setting of circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(19) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(20) The present invention may be any combination of the above-described embodiment and modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A content distribution system comprising a transmission device and a reception device, wherein contents are transferred between the transmission device and the reception device,
   wherein the reception device comprises:
      a key storage unit storing therein a plurality of public keys, a plurality of public key identifiers for identifying the plurality of public keys, respectively, and a private key, wherein the plurality of public keys includes an authorized public key making an authorized key pair with the private key, and the rest of the plurality of public keys are dummy public keys, each of which do not make the authorized key pair with the private key; and
      a key transmission unit that transmits the plurality of public keys that is composed the authorized public key and the dummy public keys, and the plurality of public key identifiers to the transmission device,
   wherein the transmission device comprises:
      a key obtaining unit that obtains, from the reception device, the plurality of public keys that is composed of the authorized public key and the dummy public keys, and the plurality of public key identifiers for identifying the plurality of public keys, respectively;
      a receiving unit that receives a content;
      a dividing unit that divides the received content into a plurality of partial contents;
      a copying unit that generates a plurality of duplicate partial contents by (i) selecting a partial content from among the plurality of partial contents and (ii) duplicating the selected partial content to generate a number of the plurality of duplicate partial contents equal to the number of the plurality of public keys identifiers obtained by the key obtaining unit;
      a watermark embedding unit that embeds a different public key identifier from among the plurality of public key identifiers obtained by the key obtaining unit, as an electronic watermark, into each of the plurality of duplicate partial contents;

a content key generation unit that generates a plurality of content keys that are different from each other;

a first encryption unit that generates a plurality of encrypted content keys by (i) encrypting a single content key, from among the content keys generated by the content key generating unit, using each of the plurality of public keys and (ii) encrypting each of the remaining plurality of content keys generated by the content key generating unit using a different public key from among the plurality of public keys;

a second encryption unit that generates a plurality of encrypted partial contents by E1 encrypting each of the plurality of partial contents that have not been duplicated using the single content key and (ii) encrypting each of the plurality of duplicate partial contents using a different content key from among the remaining plurality of content keys; and a transmission unit that transmits the plurality of encrypted partial contents and the plurality of encrypted content keys to the reception device, and wherein the reception device further comprises:

a content receiving unit that receives the plurality of encrypted partial contents and the plurality of encrypted content keys transmitted by the key transmission unit, from the transmission device;

a first decryption unit that obtains the single content key and one of the remaining plurality of content keys by decrypting the plurality of encrypted content keys using the private key stored in the key storage unit; and a second decryption unit that obtains the content by decrypting the plurality of encrypted partial contents received by the content receiving unit into a plain text based on the single content key and the one of the remaining plurality of content keys.

2. The content distribution system of claim 1, wherein the key storage unit stores a plurality of certificates, each of which includes a public key being a different one of the plurality of public keys, a public key identifier being a different one of the plurality of public key identifiers, and a digital signature for the public key and the public key identifier included in a same certificate, and wherein the key transmission unit transmits the plurality of certificates to the transmission device.

3. The content distribution system of claim 2, wherein the key storage unit stores a plurality of dummy private keys, each of which corresponds to a different one of the plurality of public keys except for the authorized public key that makes the authorized key pair with the private key, and wherein each of the plurality of dummy private keys prevent a corresponding public key encrypted text from being decrypted into a proper plain text, each of the public key encrypted texts being generated by encrypting a corresponding plain text using, as an encryption key, a public key that corresponds to a dummy private key from among the plurality of dummy private keys.

4. The content distribution system of claim 1, wherein the key storage unit further stores therein a flag that is associated with the private key and the authorized public key and indicates that the private key and the authorized public key make the authorized key pair.

5. The content distribution system of claim 1, wherein the watermark embedding unit embeds the different public key identifier into a still picture, a moving picture, or audio data in each of the plurality of duplicate partial contents.

6. A method for use in a content distribution system for transferring contents between a transmission device and a reception device, wherein the reception device stores therein a plurality of public keys, a plurality of public key identifiers for identifying the plurality of public keys, respectively, and a private key, wherein the plurality of public keys includes an authorized public key making an authorized key pair with the private key, and the rest of the plurality of public keys are dummy public keys, each of which do not make the authorized key pair with the private key, the method comprising the step, performed by the reception device, of transmitting the plurality of public keys and the plurality of public key identifiers to the transmission device;

the method comprising the steps, performed by the transmission device, of:

obtaining, from the reception device, the plurality of public keys that is composed of the authorized public key and the dummy public keys, and the plurality of public key identifiers for identifying the public keys, respectively;

receiving a content;

dividing the received content into a plurality of partial contents;

generating a plurality of duplicate partial contents by (i) selecting a partial content from among the plurality of partial contents and (ii) duplicating the selected partial content to generate a number of the plurality of duplicate partial contents equal to the number of the plurality of public keys identifiers obtained by the key obtaining unit;

embedding a different public key identifier from among the plurality of public key identifiers obtained in the step of obtaining, as an electronic watermark, into each of the plurality of duplicate partial contents;

generating a plurality of content keys that are different from each other;

generating a plurality of encrypted content keys by (i) encrypting a single content key, from among the content keys generated in the step of generating the plurality of content keys, using each of the plurality of public keys and (ii) encrypting each of the remaining plurality of content keys generated in the step of generating the plurality of content keys using a different public key from among the plurality of public keys;

generating a plurality of encrypted partial contents by (i) encrypting each of the plurality of partial contents that have not been duplicated using the single content key and (ii) encrypting each of the plurality of duplicate partial contents using a different content key from among the remaining plurality of content keys; and transmitting the plurality of encrypted partial contents and the plurality of encrypted content keys to the reception device, and the method comprising the steps, further performed by the reception device, of:

receiving the plurality of encrypted partial contents and the plurality of encrypted content keys transmitted in the step of transmitting performed by the reception device, from the transmission device;

obtaining the single content key and one of the remaining plurality of content keys by decrypting the plurality of encrypted content keys using the private key stored in the key storage unit; and obtaining the content by decrypting the plurality of encrypted partial contents received in the step of receiving performed by the reception device into a plain text based on the single content key and the one of the remaining plurality of content keys.

7. The method of claim 6,
wherein the reception device further stores therein a flag that is associated with the private key and the authorized public key and indicates that the private key and the authorized public key make the authorized key pair.

8. The method of claim 6,
wherein the generating the plurality of contents that are different from each other step embeds the different public key identifier into a still picture, a moving picture, or audio data in each of the plurality of duplicate partial contents.

9. A non-transitory computer readable recording medium having stored thereon a computer program for use in a content distribution system for transferring contents between a transmission device and a reception device, wherein the reception device stores therein a plurality of public keys, a plurality of public key identifiers for identifying the plurality of public keys, respectively, and a private key, wherein the plurality of public keys includes an authorized public key making an authorized key pair with the private key, and the rest of the plurality of public keys are dummy public keys, each of which do not make the authorized key pair with the private key, wherein, when executed, the computer program causes the content distribution system to perform a method comprising the step, performed by the reception device, of transmitting the plurality of public keys and the plurality of public key identifiers to the transmission device, wherein, when executed, the computer program causes the content distribution system to perform a method comprising the steps, performed by the transmission device, of:

obtaining, from the reception device, the plurality of public keys that is composed of the authorized public key and the dummy public keys, and the plurality of public key identifiers for identifying the public keys, respectively;

receiving a content;

dividing the received content into a plurality of partial contents;

generating a plurality of duplicate partial contents by (i) selecting a partial content from among the plurality of partial contents and (ii) duplicating the selected partial content to generate a number of the plurality of duplicate partial contents equal to the number of the plurality of public keys identifiers obtained by the key obtaining unit;

embedding a different public key identifier from among the plurality of public key identifiers obtained in the step of obtaining, as an electronic watermark, into each of the plurality of duplicate partial contents;

generating a plurality of content keys that are different from each other;

generating a plurality of encrypted content keys by (i) encrypting a single content key, from among the content keys generated in the step of generating the plurality of content keys, using each of the plurality of public keys and (ii) encrypting each of the remaining plurality of content keys generated in the step of generating the plurality of content keys using a different public key from among the plurality of public keys;

generating a plurality of encrypted partial contents by (i) encrypting each of the plurality of partial contents that have not been duplicated using the single content key and (ii) encrypting each of the plurality of duplicate partial contents using a different content key from among the remaining plurality of content keys; and transmitting the plurality of encrypted partial contents and the plurality of encrypted content keys to the reception device, wherein, when executed, the computer program causes the content distribution system to perform the method comprising the steps, further performed by the reception device, of:

receiving the plurality of encrypted contents and the plurality of encrypted content keys transmitted in the step of transmitting performed by the reception device, from the transmission device;

obtaining the single content key and one of the remaining plurality of content keys by decrypting the plurality of encrypted content keys using the private key stored in the key storage unit; and obtaining the content by decrypting the plurality of encrypted partial contents received in the step of receiving performed by the reception device into a plain text based on the single content key and the one of the remaining plurality of content keys.

10. The non-transitory computer readable recording medium of claim 9,
wherein reception device further stores therein a flag that is associated with the private key and the authorized public key and indicates that the private key and the authorized public key make the authorized key pair.

11. The non-transitory computer readable recording medium of claim 9,
wherein the generating the plurality of contents that are different from each other step embeds the different public key identifier into a still picture, a moving picture, or audio data in each of the plurality of the duplicate partial contents.

* * * * *